(12) United States Patent
Zhang

(10) Patent No.: US 12,133,246 B2
(45) Date of Patent: Oct. 29, 2024

(54) COMMUNICATION METHOD AND APPARATUS

(71) Applicant: HUAWEI TECHNOLOGIES CO., LTD., Guangdong (CN)

(72) Inventor: Lili Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 394 days.

(21) Appl. No.: 17/513,446

(22) Filed: Oct. 28, 2021

(65) Prior Publication Data
US 2022/0053515 A1 Feb. 17, 2022

Related U.S. Application Data

(63) Continuation of application No. PCT/CN2020/087865, filed on Apr. 29, 2020.

(30) Foreign Application Priority Data

Apr. 30, 2019 (CN) .......................... 201910365462.6

(51) Int. Cl.
H04W 72/53 (2023.01)
H04W 4/40 (2018.01)
(Continued)

(52) U.S. Cl.
CPC ..... *H04W 72/542* (2023.01); *H04W 72/1263* (2013.01)

(58) Field of Classification Search
CPC ........... H04W 72/542; H04W 72/1263; H04W 72/21; H04W 92/18
See application file for complete search history.

(56) References Cited

U.S. PATENT DOCUMENTS

2017/0273077 A1* 9/2017 Kim ...................... H04W 76/14
2017/0295601 A1* 10/2017 Kim ...................... H04W 72/20
(Continued)

FOREIGN PATENT DOCUMENTS

CN 106464610 B 2/2017
CN 108141847 A 6/2018
(Continued)

OTHER PUBLICATIONS

3GPP TSG RAN WG1 meeting#85, R1-165200 Title: UE-Specific Aperiodic CSI-RS with Semi-static Resource Resrvation (Year: 2016).*

(Continued)

*Primary Examiner* — Faruk Hamza
*Assistant Examiner* — Abusayeed M Haque
(74) *Attorney, Agent, or Firm* — Fish & Richardson P.C.

(57) ABSTRACT

This application provides a communication method and apparatus. In the method, a terminal may obtain a main resource pool used to transmit sidelink data and a supplementary resource pool used to transmit the sidelink data. The terminal may request, based on a requirement of the terminal, a resource in the main resource pool or a resource in the supplementary resource pool to transmit the sidelink data. For example, when the resource in the main resource pool cannot meet a data transmission requirement of a large quantity of V2X (vehicle-to-everything) services, the terminal may request the resource in the supplementary resource pool to transmit the sidelink data.

16 Claims, 7 Drawing Sheets

(51) Int. Cl.
*H04W 72/1263* (2023.01)
*H04W 72/542* (2023.01)

(56) References Cited

U.S. PATENT DOCUMENTS

| | | | | |
|---|---|---|---|---|
| 2017/0311344 | A1* | 10/2017 | Lee | H04W 74/0833 |
| 2018/0020387 | A1 | 1/2018 | Van Der Velde et al. | |
| 2018/0042023 | A1* | 2/2018 | Sheng | H04W 4/40 |
| 2018/0213379 | A1* | 7/2018 | Xiong | H04W 4/70 |
| 2018/0368136 | A1* | 12/2018 | Lien | H04L 5/0091 |
| 2019/0132893 | A1* | 5/2019 | Lu | H04L 41/0806 |
| 2019/0254075 | A1* | 8/2019 | Sun | H04W 74/02 |

FOREIGN PATENT DOCUMENTS

| | | | | |
|---|---|---|---|---|
| CN | 108353400 | A | | 7/2018 |
| CN | 108696935 | A | | 10/2018 |
| CN | 108781441 | A | | 11/2018 |
| CN | 108810906 | A | | 11/2018 |
| CN | 109219131 | A | | 1/2019 |
| CN | 109391918 | A | | 2/2019 |
| CN | 109565473 | | * 4/2019 | ........ H04W 28/0286 |
| CN | 109565473 | A | | 4/2019 |
| CN | 109691210 | A | | 4/2019 |
| CN | 109845376 | A | | 6/2019 |
| CN | 110622593 | A | | 12/2019 |
| CN | 105393590 | B | | 2/2020 |
| EP | 3413649 | A1 | | 12/2018 |
| WO | 2018081979 | A1 | | 5/2018 |
| WO | 2018142785 | A1 | | 8/2018 |
| WO | 2018188585 | A1 | | 10/2018 |
| WO | 2018201415 | A1 | | 11/2018 |
| WO | 2019004883 | A1 | | 1/2019 |
| WO | 2019028846 | A1 | | 2/2019 |
| WO | 2019029144 | A1 | | 2/2019 |
| WO | 2019051803 | A1 | | 3/2019 |
| WO | WO-2019240808 | A1 | * 12/2019 | ............ H04W 72/12 |

OTHER PUBLICATIONS

3GPP TSG RAN WG1 Meeting#79, R1-144614 Title:TDD configuration and resource allocation in OOC (Year: 2014).*

3GPP TSG-RAN WG1 Meeting#93, R1-1807587 Title:Clearification on CSI-RS resource aggregaion (Year: 2018).*

3GPP TSG RAN WG1#95, R1-1814176 Title: Feature lead's Summary on Offline Discussion for Channel Access procedure (Year: 2018).*

Bonjom et al., "Enhanced 5G V2X Services using Sidelink Device-to-Device Communications," HAL, Jul. 2018, 8 pages.

CATT, "Discussion on resource pool sharing between mode 3 and mode 4," 3GPP TSG RAN WG1 Meeting #89, R1-1707450, Hangzhou, China, May 15-19, 2017, 3 pages.

Huawei, HiSilicon, "Comparison of different options regarding the new parameter for Tx carrier selection," 3GPP TSG-RAN WG2 Meeting #101bis, R2-1806332, Sanya, China, Apr. 16-20, 2018, 20 pages.

Huawei et al., "Introduce V2X in TS 36.331," 3GPP TSG-RAN WG2 Meeting #97, R2-1702420, Athens, Greece, Feb. 13-17, 2016, 102 pages.

Huawei et al., "Introduce V2X in TS 36.331," 3GPP TSG-RAN WG2 Meeting #97, R2-1701363, Athens, Greece, Feb. 13-17, 2016, 45 pages.

Huawei et al., "Study sidelink resource allocation mechanism," 3GPP TSG-RAN WG2 # 103bis, R2-1815199, Chengdu, China, Oct. 8-12, 2018, 4 pages.

Office Action issued in Chinese Application No. 201910365462.6 on Mar. 23, 2021, 17 pages (with English translation).

Office Action issued in Chinese Application No. 201910365462.6 on Sep. 13, 2021, 18 pages (with English translation).

PCT International Search Report and Written Opinion issued in International Application No. PCT/CN2020/087865 on Jul. 30, 2020, 16 pages (with English translation).

ZTE, "Discussion on remaining issues of carrier selection/reselection," 3GPP TSG RAN WG2 Meeting #101bis, R2-1804510, Sanya, China, Apr. 16-20, 2018, 5 pages.

ZTE, Sanechips, "Consideration on NR V2X mode 1 resource allocation," 3GPP TSG-RAN WG2#104, R2-1816980, Spokane, USA, Nov. 12-16, 2018, 12 pages.

Extended European Search Report issued in European Application No. 20799423.7 on May 13, 2022, 11 pages.

ZTE et al., "Consideration on NR V2X mode 1 resource allocation," 3GPP TSG-RAN WG2#104, R2-1816980, Spokane, USA, Nov. 12-16, 2018, 4 pages.

* cited by examiner

COMMUNICATION METHOD AND APPARATUS

CROSS-REFERENCE TO RELATED APPLICATIONS

This application is a continuation of International Application No. PCT/CN2020/087865, filed on Apr. 29, 2020, which claims priority to Chinese Patent Application No. 201910365462.6, filed on Apr. 30, 2019. The disclosures of the aforementioned applications are hereby incorporated by reference in their entireties.

TECHNICAL FIELD

This application relates to the field of communication technologies, and in particular, to a communication method and apparatus.

BACKGROUND

In a long term evolution (long term evolution, LTE for short) system or a new radio (new radio, NR for short) system, a terminal and a network device may communicate with each other, and terminals may also communicate with each other. In a device-to-device (device-to-device, D2D for short) communication scenario or a vehicle-to-everything (vehicle-to-everything, V2X for short) communication scenario, a link on which a terminal sends data to a network device is referred to as an uplink (uplink, UL for short), and a link on which the terminal receives data from the network device is referred to as a downlink (downlink, DL for short). A link for transmitting data between terminals is referred to as a sidelink (sidelink, SL for short).

V2X is used as an example. A network device may semi-statically allocate, to a plurality of terminals, a resource pool used to transmit sidelink data. Resources in the resource pool are shared by the plurality of terminals. Any terminal may request, from the network device, a resource in the resource pool to transmit sidelink data, or select a resource in the resource pool to transmit sidelink data. When V2X services of some or all terminals in the plurality of terminals suddenly increase, the terminals require a relatively large quantity of sidelink transmission resources, but the resources in the resource pool may not be sufficient. However, because the resource pool is semi-statically allocated to the terminals, the network device cannot dynamically adjust the resources for the terminals. Consequently, V2X services may not be normally performed.

SUMMARY

Embodiments of this application provide a communication method and apparatus, to ensure that a V2X service is normally performed.

To achieve the foregoing objective, the embodiments of this application provide the following technical solutions.

According to a first aspect, a communication method is provided, including: A terminal obtains a main resource pool (denoted as a first resource pool) used to transmit sidelink data and a supplementary resource pool (denoted as a second resource pool) used to transmit the sidelink data, and sends a first request used to request a resource in the second resource pool for the sidelink data to a network device. According to the method provided in the first aspect, the terminal may obtain the first resource pool and the second resource pool, and the terminal may request, based on a requirement of the terminal, a resource in the first resource pool or a resource in the second resource pool to transmit the sidelink data. For example, when the resource in the first resource pool cannot meet a data transmission requirement of a large quantity of V2X services, the terminal may request the resource in the second resource pool to transmit the sidelink data. This ensures that the V2X services are normally performed.

With reference to the first aspect, in a possible implementation, that the terminal obtains a first resource pool and a second resource pool includes: The terminal receives a first configuration used to configure the first resource pool and a second configuration used to configure the second resource pool from a network device.

According to a second aspect, a communication method is provided, including: A terminal obtains a supplementary resource pool (denoted as a second resource pool) used to transmit sidelink data, and sends a first request used to request a resource in the second resource pool for the sidelink data to a network device. According to the method provided in the second aspect, the terminal may obtain the second resource pool, and the terminal may request, based on a requirement of the terminal, the resource in the second resource pool to transmit the sidelink data. This ensures that a V2X service is normally performed.

With reference to the second aspect, in a possible implementation, the method further includes: The terminal obtains a main resource pool (denoted as a first resource pool) used to transmit the sidelink data.

With reference to the second aspect, in a possible implementation, that the terminal obtains a second resource pool includes: The terminal receives a second configuration used to configure the second resource pool from the network device.

With reference to the second aspect, in a possible implementation, that the terminal obtains a first resource pool includes: The terminal receives a first configuration used to configure the first resource pool from the network device.

With reference to the first aspect or the second aspect, in a possible implementation, the second resource pool is used to transmit cellular link data, but can be used to transmit the sidelink data based on a request of the terminal, the second resource pool is used to transmit the sidelink data and cellular link data, the second resource pool is one of a plurality of resource pools configured for the terminal, or the second resource pool is one of a plurality of resource pools configured for the terminal and used to transmit the sidelink data. In this possible implementation, utilization of the resource in the second resource pool can be improved.

With reference to the first aspect or the second aspect, in a possible implementation, the first resource pool and the second resource pool are semi-statically configured.

With reference to the first aspect or the second aspect, in a possible implementation, that the terminal sends a first request to a network device includes: The terminal sends the first request to the network device based on at least one of congestion information of the first resource pool, channel occupancy information of the first resource pool, a service type of the terminal, and a quality of service (Quality of Service, QoS for short) level of the terminal. In this possible implementation, the terminal may determine, based on a requirement of the terminal, whether to request the resource in the second resource pool, so that the method is applicable to different scenarios.

With reference to the first aspect or the second aspect, in a possible implementation, the first request is a scheduling request (scheduling request, SR for short), the first request is carried on a second-type SR resource, and the SR carried on the second-type SR resource is used to request the resource in the second resource pool for the sidelink data. In this possible implementation, the terminal does not need to send additional signaling to notify the network device that a requested resource is the resource in the second resource pool, so that signaling overheads can be reduced.

With reference to the first aspect or the second aspect, in a possible implementation, the method further includes: The terminal obtains an SR resource, where the SR resource includes a first-type SR resource and the second-type SR resource, and an SR carried on the first-type SR resource is used to request a resource in the first resource pool for the sidelink data.

With reference to the first aspect or the second aspect, in a possible implementation, that the terminal obtains an SR resource includes: The terminal receives an SR resource configuration used to configure the SR resource from the network device.

With reference to the first aspect or the second aspect, in a possible implementation, at least one of the first-type SR resource and the second-type SR resource is preconfigured.

With reference to the first aspect or the second aspect, in a possible implementation, the first request is a buffer status report (buffer status report, BSR for short) including first indication information, and the first indication information is used to indicate that a resource requested by using the first request for the sidelink data is the resource in the second resource pool. In this possible implementation, the terminal does not need to send additional signaling to notify the network device that a requested resource is the resource in the second resource pool, so that signaling overheads can be reduced.

With reference to the first aspect or the second aspect, in a possible implementation, the first request is a message used to report the congestion information or channel occupancy information of the first resource pool, the first request includes the congestion information or channel occupancy information of the first resource pool, the first request further includes first indication information, and the first indication information is used to indicate that a resource requested by using the first request for the sidelink data is the resource in the second resource pool. In this possible implementation, the terminal does not need to send additional signaling to notify the network device that a requested resource is the resource in the second resource pool, so that signaling overheads can be reduced.

With reference to the first aspect or the second aspect, in a possible implementation, the method further includes: The terminal receives second indication information used to indicate, to the terminal, a resource for transmitting the sidelink data from the network device, and transmits the sidelink data on the resource indicated by the second indication information. The resource indicated by the second indication information belongs to the second resource pool.

With reference to the first aspect or the second aspect, in a possible implementation, the method further includes: When time of using, by the terminal, the resource indicated by the second indication information is greater than or equal to a first threshold, the terminal releases the resource indicated by the second indication information. In this possible implementation, when the time of using, by the terminal, the resource indicated by the second indication information is greater than or equal to the first threshold, the terminal needs to stop using the resource indicated by the second indication information, that is, release the resource indicated by the second indication information, so that the resource is subsequently reallocated. This ensures that the network device flexibly schedules the resource in the second resource pool.

According to a third aspect, a communication method is provided, including: A network device determines a first configuration used to configure a first resource pool and a second configuration used to configure a second resource pool, and sends the first configuration and the second configuration to a terminal, where the first resource pool is a main resource pool used to transmit sidelink data, and the second resource pool is a supplementary resource pool used to transmit the sidelink data. According to the method provided in the third aspect, the terminal may obtain the first resource pool and the second resource pool, and the terminal may request, based on a requirement of the terminal, a resource in the first resource pool or a resource in the second resource pool to transmit the sidelink data. For example, when the resource in the first resource pool cannot meet a data transmission requirement of a large quantity of V2X services, the terminal may request the resource in the second resource pool to transmit the sidelink data. This ensures that the V2X services are normally performed.

According to a fourth aspect, a communication method is provided, including: A network device determines a second configuration used to configure a second resource pool, and sends the second configuration to a terminal, where the second resource pool is a supplementary resource pool used to transmit sidelink data. According to the method provided in the fourth aspect, the terminal may obtain the second resource pool, and the terminal may request, based on a requirement of the terminal, the resource in the second resource pool to transmit the sidelink data. This ensures that a V2X service is normally performed.

With reference to the fourth aspect, in a possible implementation, the method further includes: The network device determines a first configuration used to configure a first resource pool, and sends the first configuration to the terminal, where the first resource pool is a main resource pool used to transmit the sidelink data.

With reference to the third aspect or the fourth aspect, in a possible implementation, the second resource pool is used to transmit cellular link data, but can be used to transmit the sidelink data based on a request of the terminal, the second resource pool is used to transmit the sidelink data and cellular link data, the second resource pool is one of a plurality of resource pools configured for the terminal, or the second resource pool is one of a plurality of resource pools configured for the terminal and used to transmit the sidelink data.

With reference to the third aspect or the fourth aspect, in a possible implementation, the first resource pool and the second resource pool are semi-statically configured.

With reference to the third aspect or the fourth aspect, in a possible implementation, the method further includes: The network device receives a first request used to request the resource in the second resource pool for the sidelink data from the terminal.

With reference to the third aspect or the fourth aspect, in a possible implementation, the first request is an SR, and the first request is carried on a second-type SR resource; and the SR carried on the second-type SR resource is used to request the resource in the second resource pool for the sidelink data.

With reference to the third aspect or the fourth aspect, in a possible implementation, an SR resource includes a first-type SR resource and the second-type SR resource, and an SR carried on the first-type SR resource is used to request a resource in the first resource pool for the sidelink data.

With reference to the third aspect or the fourth aspect, in a possible implementation, the method further includes: The network device sends an SR resource configuration used to configure the SR resource to the terminal.

With reference to the third aspect or the fourth aspect, in a possible implementation, the first request is a BSR including first indication information, and the first indication information is used to indicate that a resource requested by using the first request for the sidelink data is the resource in the second resource pool.

With reference to the third aspect or the fourth aspect, in a possible implementation, the first request is a message used to report congestion information or channel occupancy information of the first resource pool, the first request includes the congestion information or channel occupancy information of the first resource pool, the first request further includes first indication information, and the first indication information is used to indicate that a resource requested by using the first request for the sidelink data is the resource in the second resource pool.

With reference to the third aspect or the fourth aspect, in a possible implementation, the method further includes: The network device sends second indication information to the terminal based on the first request, where the second indication information is used to indicate, to the terminal, a resource for transmitting the sidelink data, and the resource indicated by the second indication information belongs to the second resource pool.

For beneficial effects of the possible implementations of the third aspect and the fourth aspect, refer to beneficial effects of corresponding implementations of the first aspect and the second aspect. Details are not described again.

According to a fifth aspect, a communication method is provided, including: A first communication device obtains a third resource pool and a fourth resource pool, where the third resource pool is a main resource pool used to transmit first-type data or a resource pool used to transmit the first-type data; and the fourth resource pool is a supplementary resource pool used to transmit the first-type data or a resource pool used to transmit the first-type data based on a request; and the first-type data is data of a first service type, data of a first QoS level, or access link data; and the first communication device sends a second request to a second communication device, where the second request is used to request a resource in the fourth resource pool for the first-type data. Optionally, the second request is an SR, the second request is carried on a fourth-type SR resource, and the SR carried on the fourth-type SR resource is used to request the resource in the fourth resource pool for the first-type data; the second request is a BSR, the BSR includes third indication information, and the third indication information is used to indicate that a resource requested by using the second request for the first-type data is the resource in the fourth resource pool; or the second request is a message used to report congestion information or channel occupancy information of the third resource pool, the second request includes the congestion information or channel occupancy information of the third resource pool, the second request further includes third indication information, and the third indication information is used to indicate that a resource requested by using the second request for the first-type data is the resource in the fourth resource pool.

According to the method provided in the fifth aspect, the first communication device may obtain the third resource pool and the fourth resource pool, and the first communication device may request, based on a requirement of the first communication device, a resource in the third resource pool or a resource in the fourth resource pool to transmit the first-type data. For example, when the resource in the third resource pool cannot meet a transmission requirement of a large amount of first-type data, the first communication device may request the resource in the fourth resource pool to transmit the first-type data. When requesting the resource in the fourth resource pool, the first communication device may indicate, by using the SR, the BSR, or the message used to report the congestion information or channel occupancy information of the third resource pool, that the requested resource is the resource in the fourth resource pool, and the first communication device does not need to send additional signaling to notify the second communication device of the information, so that normal transmission of the first-type data can be ensured without adding the additional signaling.

With reference to the fifth aspect, in a possible implementation, that a first communication device obtains a third resource pool and a fourth resource pool includes: The first communication device receives a third configuration and a fourth configuration from the second communication device, where the third configuration is used to configure the third resource pool, and the fourth configuration is used to configure the fourth resource pool.

According to a sixth aspect, a communication method is provided, including: A first communication device obtains a fourth resource pool, where the fourth resource pool is a supplementary resource pool used to transmit first-type data or a resource pool used to transmit first-type data based on a request, and the first-type data is data of a first service type, data of a first QoS level, or access link data. The first communication device sends a second request to a second communication device, where the second request is used to request a resource in the fourth resource pool for the first-type data. Optionally, the second request is an SR, the second request is carried on a fourth-type SR resource, and the SR carried on the fourth-type SR resource is used to request the resource in the fourth resource pool for the first-type data; the second request is a BSR, the BSR includes third indication information, and the third indication information is used to indicate that a resource requested by using the second request for the first-type data is the resource in the fourth resource pool; or the second request is a message used to report congestion information or channel occupancy information of a third resource pool, the second request includes the congestion information or channel occupancy information of the third resource pool, the second request further includes third indication information, and the third indication information is used to indicate that a resource requested by using the second request for the first-type data is the resource in the fourth resource pool.

According to the method provided in the sixth aspect, the first communication device may obtain the fourth resource pool, and the first communication device may request, based on a requirement of the first communication device, the resource in the fourth resource pool to transmit the first-type data, to ensure normal transmission of the first-type data.

With reference to the sixth aspect, in a possible implementation, the method further includes: The first communication device obtains the third resource pool, where the third resource pool is a main resource pool used to transmit the first-type data or a resource pool used to transmit the first-type data.

With reference to the sixth aspect, in a possible implementation, that a first communication device obtains a fourth resource pool includes: The first communication device receives a fourth configuration from the second communication device, where the fourth configuration is used to configure the fourth resource pool.

With reference to the sixth aspect, in a possible implementation, that the first communication device obtains the third resource pool includes:

The first communication device receives a third configuration from the second communication device, where the third configuration is used to configure the third resource pool.

With reference to the fifth aspect or the sixth aspect, in a possible implementation, when the third resource pool is used for transmission of data of the first service type, the fourth resource pool is used for transmission of data of a second service type, but can be used for transmission of data of the first service type based on a request of the first communication device, or the fourth resource pool is used for transmission of data of the first service type and the second service type; when the third resource pool is used for transmission of data of the first QoS level, the fourth resource pool is used for transmission of data of a second QoS level, but can be used for transmission of data of the first QoS level based on a request of the first communication device, or the fourth resource pool is used for transmission of data of the first QoS level and the second QoS level; when the third resource pool is used for transmission of the access link data, the fourth resource pool is used for transmission of backhaul link data, but can be used for transmission of the access link data based on a request of the first communication device, or the fourth resource pool is used for transmission of the access link data and the backhaul link data.

With reference to the fifth aspect or the sixth aspect, in a possible implementation, the method further includes: The first communication device obtains an SR resource, where the SR resource includes a third-type SR resource and the fourth-type SR resource, and an SR carried on the third-type SR resource is used to request the resource in the third resource pool for the first-type data.

With reference to the fifth aspect or the sixth aspect, in a possible implementation, that the first communication device obtains an SR resource includes: The first communication device receives an SR resource configuration from the second communication device, where the SR resource configuration is used to configure the SR resource.

With reference to the fifth aspect or the sixth aspect, in a possible implementation, at least one of the third-type SR resource and the fourth-type SR resource is preconfigured.

With reference to the fifth aspect or the sixth aspect, in a possible implementation, that the first communication device sends a second request to a second communication device includes: The first communication device sends the second request to the second communication device based on at least one of the congestion information of the third resource pool, the channel occupancy information of the third resource pool, a service type of the first communication device, and a QoS level of the first communication device.

With reference to the fifth aspect or the sixth aspect, in a possible implementation, the method further includes: The first communication device receives fourth indication information from the second communication device, where the fourth indication information is used to indicate, for the first communication device, a resource for transmitting the first-type data, and the resource indicated by the fourth indication information belongs to the fourth resource pool. The first communication device transmits the first-type data on the resource indicated by the fourth indication information.

With reference to the fifth aspect or the sixth aspect, in a possible implementation, the method further includes: When time of using, by the first communication device, the resource indicated by the fourth indication information is greater than or equal to a first threshold, the first communication device releases the resource indicated by the fourth indication information.

With reference to the fifth aspect or the sixth aspect, in a possible implementation, the first-type data is sidelink data, and a symbol used to transmit the sidelink data is configured by using semi-static signaling sent by the second communication device.

With reference to the fifth aspect or the sixth aspect, in a possible implementation, the third configuration is carried in the semi-static signaling, and/or the fourth configuration is carried in the semi-static signaling.

With reference to the fifth aspect or the sixth aspect, in a possible implementation, the third configuration is used to configure the third resource pool through a bitmap, and/or the fourth configuration is used to configure the fourth resource pool through a bitmap.

With reference to the fifth aspect or the sixth aspect, in a possible implementation, the first-type data is the sidelink data, and a bit in the bitmap is used to indicate that one or more of slots or symbols are used to transmit the sidelink data.

With reference to the fifth aspect or the sixth aspect, in a possible implementation, the third configuration is used to configure one or more symbols of symbols in one or more slots as the third resource pool, and/or the fourth configuration is used to configure one or more symbols of symbols in one or more slots as the fourth resource pool.

With reference to the fifth aspect or the sixth aspect, in a possible implementation, the first-type data is the sidelink data, and the symbols in the one or more slots are symbols used to transmit the sidelink data; and the symbols in the one or more slots are all symbols in at least one slot of the one or more slots, the symbols in the one or more slots are some symbols in at least one slot of the one or more slots, or the symbols in the one or more slots are all symbols in at least one slot of the one or more slots and some symbols in at least one slot of the one or more slots.

According to a seventh aspect, a communication method is provided, including: A second communication device sends a third configuration and a fourth configuration to a first communication device, where the third configuration is used to configure a third resource pool, the third resource pool is a main resource pool used to transmit first-type data or a resource pool used to transmit the first-type data, the fourth configuration is used to configure a fourth resource pool, and the fourth resource pool is a supplementary resource pool used to transmit the first-type data or a resource pool used to transmit the first-type data based on a request. The second communication device receives a second request from the first communication device, where the second request is used to request a resource in the fourth resource pool for the first-type data. Optionally, the second request is an SR, the second request is carried on a fourth-type SR resource, and the SR carried on the fourth-type SR resource is used to request the resource in the fourth resource pool for the first-type data; the second request is a BSR, the BSR includes third indication information, and the third indication information is used to indicate that a resource requested by using the second request for the first-type data is the resource in the fourth resource pool; or the second request is a message used to report congestion information or channel occupancy information of the third resource pool, the second request includes the congestion information or channel occupancy information of the third resource pool, the second request further includes third indication information, and the third indication information is used to indicate that a resource requested by using the second request for the first-type data is the resource in the fourth resource pool.

According to the method provided in the seventh aspect, the first communication device may obtain the third resource pool and the fourth resource pool, and the first communication device may request, based on a requirement of the first communication device, a resource in the third resource pool or a resource in the fourth resource pool to transmit the first-type data. For example, when the resource in the third resource pool cannot meet a transmission requirement of a large amount of first-type data, the first communication device may request the resource in the fourth resource pool to transmit the first-type data. When requesting the resource in the fourth resource, the first communication device may indicate, by using the SR, the BSR, or the message used to report the congestion information or channel occupancy information of the third resource pool, that the requested resource is the resource in the fourth resource pool, and the first communication device does not need to send additional signaling to notify the second communication device of the information, so that normal transmission of the first-type data can be ensured without adding the additional signaling.

According to an eighth aspect, a communication method is provided, including: A second communication device sends a fourth configuration to a first communication device, where the fourth configuration is used to configure a fourth resource pool, and the fourth resource pool is a supplementary resource pool used to transmit the first-type data or a resource pool used to transmit the first-type data based on a request. The second communication device receives a second request from the first communication device, where the second request is used to request a resource in the fourth resource pool for the first-type data. Optionally, the second request is an SR, the second request is carried on a fourth-type SR resource, and the SR carried on the fourth-type SR resource is used to request the resource in the fourth resource pool for the first-type data; the second request is a BSR, the BSR includes third indication information, and the third indication information is used to indicate that a resource requested by using the second request for the first-type data is the resource in the fourth resource pool; or the second request is a message used to report congestion information or channel occupancy information of the third resource pool, the second request includes the congestion information or channel occupancy information of the third resource pool, the second request further includes third indication information, and the third indication information is used to indicate that a resource requested by using the second request for the first-type data is the resource in the fourth resource pool.

According to the method provided in the eighth aspect, the first communication device may obtain the fourth resource pool, and the first communication device may request, based on a requirement of the first communication device, the resource in the fourth resource pool to transmit the first-type data, to ensure normal transmission of the first-type data.

With reference to the eighth aspect, in a possible implementation, the method further includes: The second communication device sends a third configuration to the first communication device, where the third configuration is used to configure a third resource pool, and the third resource pool is a main resource pool used to transmit the first-type data or a resource pool used to transmit the first-type data.

With reference to the seventh aspect or the eighth aspect, in a possible implementation, the SR resource includes a third-type SR resource and the fourth-type SR resource, and an SR carried on the third-type SR resource is used to request a resource in the third resource pool for the first-type data.

With reference to the seventh aspect or the eighth aspect, in a possible implementation, the method further includes: The second communication device sends an SR resource configuration to the first communication device, where the SR resource configuration is used to configure the SR resource.

With reference to the seventh aspect or the eighth aspect, in a possible implementation, the method further includes: The second communication device sends fourth indication information to the first communication device based on the second request, where the fourth indication information is used to indicate, for the first communication device, a resource for transmitting the first-type data, and the resource indicated by the fourth indication information belongs to the fourth resource pool.

With reference to the seventh aspect or the eighth aspect, in a possible implementation, the first-type data is sidelink data, and the second communication device configures, for the first communication device by using semi-static signaling, a symbol used to transmit the sidelink data.

With reference to the seventh aspect or the eighth aspect, in a possible implementation, the third configuration is carried in the semi-static signaling, and/or the fourth configuration is carried in the semi-static signaling.

With reference to the seventh aspect or the eighth aspect, in a possible implementation, the third configuration is used to configure the third resource pool through a bitmap, and/or the fourth configuration is used to configure the fourth resource pool through a bitmap.

With reference to the seventh aspect or the eighth aspect, in a possible implementation, the first-type data is the sidelink data, and a bit in the bitmap is used to indicate that one or more of slots or symbols are used to transmit the sidelink data.

With reference to the seventh aspect or the eighth aspect, in a possible implementation, the third configuration is used to configure one or more symbols of symbols in one or more slots as the third resource pool, and/or the fourth configuration is used to configure one or more symbols of symbols in one or more slots as the fourth resource pool.

With reference to the seventh aspect or the eighth aspect, in a possible implementation, the first-type data is the sidelink data, and the symbols in the one or more slots are symbols used to transmit the sidelink data; and the symbols in the one or more slots are all symbols in at least one slot of the one or more slots, the symbols in the one or more slots are some symbols in at least one slot of the one or more slots, or the symbols in the one or more slots are all symbols in at least one slot of the one or more slots and some symbols in at least one slot of the one or more slots.

According to a ninth aspect, a communication apparatus is provided. The apparatus has a function of implementing any method provided in any one of the first aspect to the eighth aspect. The function may be implemented by hardware, or may be implemented by hardware by executing corresponding software. The hardware or the software includes one or more units corresponding to the function. The apparatus may exist in a product form of a chip.

According to a tenth aspect, a communication apparatus is provided. The communication apparatus includes a memory and a processor. Optionally, the communication apparatus further includes at least one communication interface and a communication bus. The memory is configured to store computer-executable instructions. The processor, the memory, and the at least one communication interface are connected through the communication bus. The processor executes the computer-executable instructions stored in the memory, to enable the communication apparatus to implement any method provided in any one of the first aspect to the eighth aspect. The apparatus may exist in a product form of a chip.

According to an eleventh aspect, a computer-readable storage medium is provided. The computer-readable storage medium includes instructions. When the instructions are run on a computer, the computer is enabled to perform any method provided in any one of the first aspect to the eighth aspect.

According to a twelfth aspect, a computer program product including instructions is provided. When the computer program product runs on a computer, the computer is enabled to perform any method provided in any one of the first aspect to the eighth aspect.

According to a thirteenth aspect, a chip is provided. The chip includes a processor and an interface. The processor is coupled to a memory through the interface. When the processor executes a computer program or instructions in the memory, any method provided in any one of the first aspect to the eighth aspect is performed.

For technical effects brought by any design manner in the ninth aspect to the thirteenth aspect, refer to technical effects brought by corresponding design manners in the first aspect to the eighth aspect. Details are not described herein again.

It should be noted that various possible implementations of any one of the foregoing aspects may be combined provided that the solutions are not contradictory.

DESCRIPTION OF EMBODIMENTS

In the descriptions of this application, unless otherwise stated, "at least one" refers to one or more, and "a plurality of" refers to two or more. Terms such as "first" and "second" do not limit a quantity and an execution sequence, and the terms such as "first" and "second" do not indicate a definite difference. The term "example" or "for example" is used to represent giving an example, an illustration, or a description. Any embodiment or design scheme described as an "example" or "for example" in this application should not be explained as being more preferred or having more advantages than another embodiment or design scheme. Exactly, use of the term "example" or "for example" or the like is intended to present a relative concept in a specific manner.

The technical solutions provided in the embodiments of this application may be applied to various communication systems, for example, an LTE system, a fifth generation (5th-generation, 5G for short) system, an NR system, a future evolved system, or a plurality of convergent communication systems.

The technical solutions provided in the embodiments of this application may be applied to a plurality of communication scenarios, for example, communication scenarios such as machine-to-machine (machine-to-machine, M2M for short), macro-micro communication, enhanced mobile broadband (enhanced mobile broadband, eMBB for short), ultra-reliable low-latency communication (ultra-reliable low-latency communication, URLLC for short) (for example, self-driving or industrial control), massive machine type communication (massive machine type communication, mMTC for short), internet of things (internet of things, IoT for short), and industrial internet of things (industrial IoT, IIoT for short), D2D, and V2X. V2X communication is special D2D communication, and the V2X communication includes but is not limited to vehicle-to-vehicle (vehicle-to-vehicle, V2V for short) communication, vehicle-to-pedestrian (vehicle-to-pedestrian, V2P for short) communication, vehicle-to-infrastructure (vehicle-to-infrastructure, V2I) communication, and vehicle-to-network (vehicle-to-network, V2N) communication.

Figure 1:
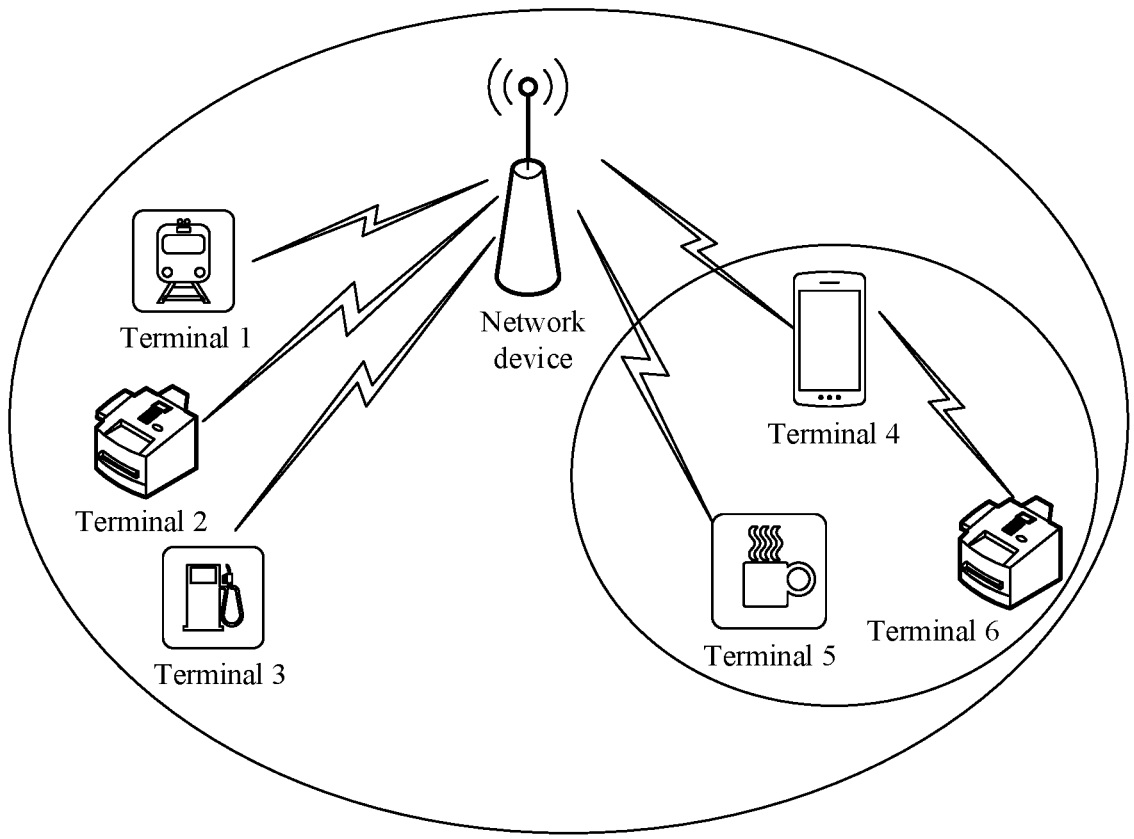
FIG. 1 is a schematic composition diagram of a network architecture according to an embodiment of this application.

FIG. 1 is a schematic diagram of a communication system to which the technical solutions are applicable according to this application. The communication system may include at least one network device (FIG. 1 shows only one network device) and at least one terminal (FIG. 1 shows six terminals, namely, a terminal 1 to a terminal 6). One or more of the terminal 1 to the terminal 6 may communicate with the network device, to transmit one or more of data and signaling. A communication interface between the terminal and the network device is referred to as a Uu interface. A link on which the terminal sends data to the network device is referred to as an uplink, and a link on which the terminal receives data from the network device is referred to as a downlink. For example, a first configuration, a second configuration, first indication information, second indication information, a first request, and the like in Embodiment 1 of this application may be transmitted between the network device and the terminal.

In FIG. 1, the terminal 4 to the terminal 6 may also form another communication system. In this case, both a sending entity and a receiving entity are terminals. A communication interface between the terminals is referred to as a PC5 interface. The PC5 interface is generally used for D2D communication and V2X communication scenarios in which direct communication can be performed between devices. A link for transmitting data between the terminals is referred to as a sidelink (which may also be referred to as a secondary link). For example, the terminal 4 to the terminal 6 may form an internet of vehicles system. In this case, if the terminal 4 is a terminal in Embodiment 1 of this application, the terminal 4 may send sidelink data to the terminal 5 on a resource indicated by the network device by using the second indication information and for transmitting the sidelink data by the terminal 4, and the terminal 5 receives the sidelink data sent by the terminal 4.

The network device in this application is an entity that is on a network side and that is configured to send a signal, receive a signal, or send a signal and receive a signal. The network device may be an apparatus that is deployed in a radio access network (radio access network, RAN for short) and that provides a wireless communication function for the terminal, for example, may be a base station. The network device may be base stations in various forms, for example, a macro base station, a micro base station (also referred to as a small cell), a relay station, and an access point (access point, AP for short), or may include control nodes in various forms, for example, a network controller. The control node may be connected to a plurality of base stations, and configure resources for a plurality of terminals covered by the plurality of base stations. In systems for which different radio access technologies are used, names of a device having a function of a base station may be different. For example, the device may be referred to as an evolved NodeB (evolved NodeB, eNB or eNodeB for short) in an LTE system, or may be referred to as a next-generation node base station (next generation node base station, gNB for short) in a 5G system or an NR system. A specific name of the base station is not limited in this application. Alternatively, the network device may be a radio controller in a cloud radio access network (cloud radio access network, CRAN for short) scenario, a network device in a future evolved public land mobile network (public land mobile network, PLMN for short), a transmission reception point (transmission reception point, TRP for short), or the like.

The terminal in this application is an entity that is on a user side and that is configured to receive a signal, send a signal, or receive a signal and send a signal. The terminal is configured to provide a user with one or more of a voice service and a data connectivity service. The terminal may also be referred to as user equipment (user equipment, UE for short), a terminal device, an access terminal, a subscriber unit, a subscriber station, a mobile station, a remote station, a remote terminal, a mobile device, a user terminal, a wireless communication device, a user agent, or a user apparatus. The terminal may be a mobile station (mobile station, MS for short), a subscriber unit (subscriber unit), an unmanned aerial vehicle, an IoT device, a station (station, ST for short) in a wireless local area network (wireless local area network, WLAN for short), a cellular phone (cellular phone), a smartphone (smartphone), a cordless phone, a wireless data card, a tablet computer, a session initiation protocol (session initiation protocol, SIP for short) phone, a wireless local loop (wireless local loop, WLL for short) station, a personal digital assistant (personal digital assistant, PDA for short) device, a laptop computer (laptop computer), a machine type communication (machine type communication, MTC for short) terminal, a handheld device with a wireless communication function, a computing device or another processing device connected to a wireless modem, a vehicle-mounted device (for example, a vehicle-mounted module, a vehicle-mounted component, a vehicle-mounted chip, or a vehicle-mounted unit that is built in a vehicle and used as one or more components or units, and the vehicle may implement the method in this application by using the vehicle-mounted module, the vehicle-mounted module, the vehicle-mounted component, the vehicle-mounted chip, or the vehicle-mounted unit that is built in the vehicle), or a wearable device (which may also be referred to as a wearable intelligent device). Alternatively, the terminal may be a terminal in a next generation communication system, for example, a terminal in a 5G system, a terminal in a future evolved PLMN, or a terminal in an NR system.

A network architecture and a service scenario that are described in the above in this application are intended to describe the technical solutions in the embodiments of this application more clearly, and do not constitute a limitation on the technical solutions provided in the embodiments of this application. A person of ordinary skill in the art may know that with evolution of a network architecture and emergence of a new service scenario, the technical solutions provided in the embodiments of this application are also applicable to similar technical problems.

For the problem raised in the background, the embodiments of this application provide a communication method, to ensure that a service of a terminal is normally performed on a sidelink. To facilitate understanding of this application, some concepts or content in the embodiments of this application is briefly described herein.

1. SR, BSR

It may be understood that if the terminal has no uplink data or sidelink data to be transmitted, the network device does not need to allocate an uplink resource or a sidelink resource to the terminal. Otherwise, a resource waste is caused. Therefore, the terminal may notify, by using the SR, the network device that the terminal has uplink data or sidelink data that needs to be transmitted, but does not notify the network device of an amount of the uplink data or the sidelink data that needs to be transmitted. The network device allocates, to the terminal based on the SR, an uplink resource for sending the BSR. The terminal sends the BSR on the uplink resource. The BSR includes information about the amount of the uplink data or the sidelink data that the terminal needs to send. The network device further allocates a resource to the terminal based on the BSR.

Specifically, the BSR may be a BSR on an uplink or a BSR on a sidelink. The BSR on the uplink may be used to notify the network device of information about an amount of data that needs to be sent on the uplink, so that the network device allocates an uplink resource to the terminal based on the information. The BSR on the sidelink may be used to notify the network device of information about an amount of data that needs to be sent on the sidelink, so that the network device allocates a sidelink resource to the terminal based on the information.

It may be understood that a function of the SR is to request, from the network device, the uplink resource for sending the BSR. Specifically, an SR used to request the uplink resource for the BSR on the uplink is an SR on the uplink, and an SR used to request the uplink resource for the BSR on the sidelink is an SR on the sidelink.

The uplink data is a physical uplink shared channel (physical uplink shared channel, PUSCH for short), and the sidelink data is a physical sidelink shared channel (physical sidelink shared channel, PSSCH for short).

2. Resource Pool

The resource pool in the embodiments of this application (for example, a first resource pool or a second resource pool below) may include one or more of a time domain resource, a frequency domain resource, and a space domain resource.

The time domain resource may include one or a combination of a radio frame (frame), a subframe (subframe), a slot (slot), a symbol (symbol), a mini-subframe (mini-subframe), a mini-slot (mini-slot), and a mini-symbol (mini-symbol). The mini-subframe is a duration less than one subframe, the mini-slot is a duration less than one slot, and the mini-symbol is a duration less than one symbol. One radio frame includes a plurality of subframes, and one subframe includes one or more slots (slot), or one radio frame includes a plurality of slots. A symbol in the embodiments of this application is an orthogonal frequency division multiplexing (orthogonal frequency division multiplexing, OFDM for short) symbol.

The frequency domain resource includes one or more of a physical resource block (physical resource block, PRB for short), a sub-channel (sub-channel), and a resource element (resource element, RE for short).

The space domain resource includes one or more of an antenna port and a beam (beam).

The resource pool in this application may also be referred to as a resource set, a resource group, a series of resources, or the like.

3. Configuration of a Time Domain Resource of a Sidelink

In an NR system, there may be a plurality of types of slots, for example, slots and mini-slots, and different types of slots include different quantities of symbols. For example, the slot (slot) includes 7 symbols or 14 symbols, and the mini-slot includes less than 7 symbols.

One slot may include one or more types of symbols. Types of symbols include a symbol used for downlink transmission (denoted as a downlink symbol), a symbol used for flexible transmission (denoted as a flexible symbol), a symbol used for uplink transmission (denoted as an uplink symbol), a guard interval symbol, and the like. A composition of the slot may be referred to as a slot format (slot format, SF for short), and there may be a maximum of 256 slot formats. At least one of quantities of uplink symbols, quantities of downlink symbols, quantities of flexible symbols, or quantities of guard interval symbols included in different slot formats is different. Specifically, the guard interval may be used for automatic gain control (automatic gain control, AGC for short).

For example, Table 1 lists slot formats of several slots. In this example, one slot includes 14 symbols. In Table 1, U refers to the uplink symbol, D refers to the downlink symbol, and F refers to the flexible symbol.

TABLE 1

| Slot | Slot format | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | U | U | U | U | U | U | U | U | D | D | D |
| 1 | U | U | U | U | U | U | U | U | U | U | U | U | U | U |
| 2 | F | F | F | F | F | F | F | F | F | F | F | F | F | F |
| 3 | D | D | D | U | U | U | U | U | U | U | U | D | D | F |

The slot format may be semi-statically or dynamically configured by the network device for the terminal.

In a case of semi-static configuration, the network device may configure the slot format for the terminal by using semi-static signaling. The semi-static signaling includes two types of signaling. One type of signaling is cell-specific (cell-specific) signaling, that is, signaling received by all terminals in a cell. In this case, the slot format is configured for all the terminals in the cell, and is a common configuration (common configuration) for all the terminals. The other type of signaling is signaling for a specific terminal, and may also be referred to as dedicated signaling (dedicated signaling). Only the terminal receives the signaling. In this case, the slot format is configured for the terminal, and is a terminal specific configuration (UE specific configuration) or a dedicated configuration (dedicated configuration). For example, one type of semi-static signaling for a specific terminal is radio resource control (radio resource control, RRC for short) signaling. The network device may notify, by using the RRC signaling, a slot format of one or more slots in a time period or a periodicity, or a slot format of one or more slots in a time period or a periodicity and a slot format of one or more symbols in the slot. For example, the RRC signaling may be a system information block (system information block, SIB for short) message.

In a case of dynamic configuration, in a possible implementation, the network device may notify the terminal of a slot format of one or more slots in a time period or a periodicity by using downlink control information (downlink control information, DCI for short) signaling (for example, DCI2_0). Specifically, notification may be made by using a slot format indicator (slot format indicator, SFI for short) in the DCI signaling. In another possible implementation, a slot combination table (which may be referred to as a UE specific table (UE specific table)) may be predefined in NR. The slot combination table includes a plurality of slot combinations, one slot combination corresponds to one identifier, and one slot combination includes information about a slot format of one or more slots. The network device may configure a slot combination table for the terminal in advance (for example, semi-statically), and then dynamically indicate, by using DCI (for example, DCI2_0, DCI1_0), a slot combination used by the terminal. For example, the DCI may carry an SFI, and the SFI may indicate an identifier of a slot combination, to dynamically indicate a slot format of one or more slots for the terminal.

After the network device indicates the slot format for the terminal, when configuring a time domain resource of a sidelink of the terminal, the network device may semi-statically or dynamically configure one or more of symbols (for example, an uplink symbol and a flexible symbol) in the one or more slots for the terminal, where the one or more of symbols are used to transmit sidelink data. Specifically, the symbols used to transmit the sidelink data in the one or more slots may be all symbols in a slot of the one or more slots, may be some symbols (consecutive symbols or non-consecutive symbols) in a slot of the one or more slots, or may be all symbols in a slot of the one or more slots and some symbols in another slot of the one or more slots. In a case of semi-static configuration, the network device may configure, for the terminal by using semi-static signaling, the symbols used to transmit the sidelink data. For descriptions of the semi-static signaling, refer to the foregoing descriptions. Details are not described herein again. For example, the network device may configure the $5^{th}$ symbol to the $8^{th}$ symbol in the four slots in Table 1 as the time domain resource of the sidelink of the terminal by using an information element SL slot configuration in RRC signaling.

Embodiment 1

Figure 2:
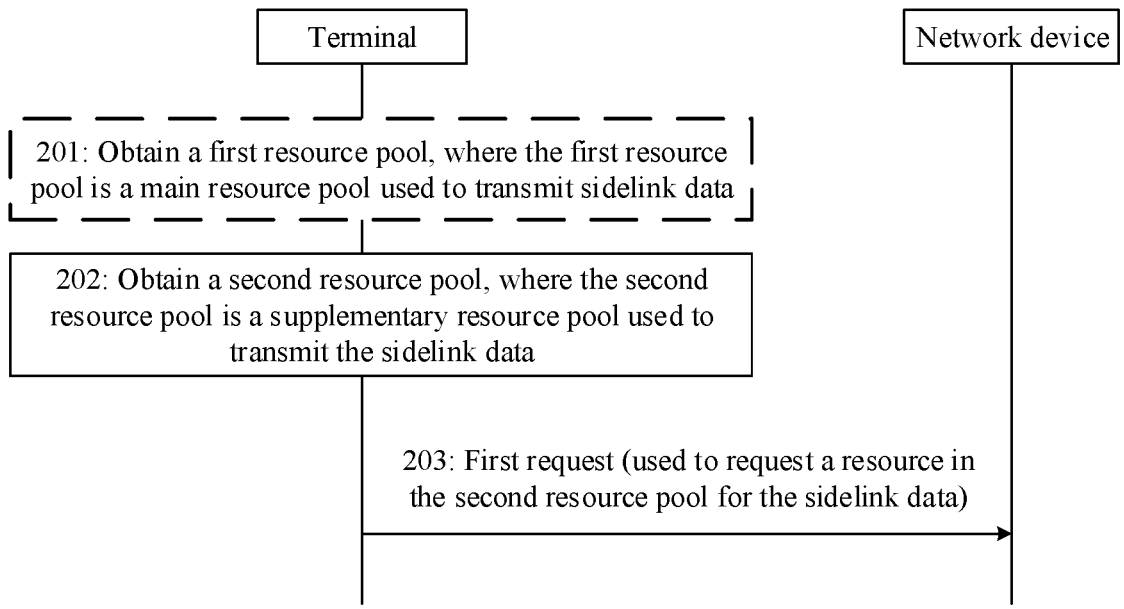
FIG. 2 to FIG. 5 each are a flowchart of a communication method according to an embodiment of this application.

An embodiment of this application provides a communication method. As shown in FIG. 2, the following steps are included.

201: A terminal obtains a first resource pool, where the first resource pool is a main resource pool used to transmit sidelink data.

The first resource pool is dedicated to a sidelink, and may be used to transmit only the sidelink data. The sidelink data in Embodiment 1 and Embodiment 2 of this application generally refers to data transmitted on the sidelink, and does not specifically refer to data transmitted between two terminals. In other words, data transmitted between a terminal 1 and a terminal 2 may be considered as the sidelink data in this embodiment of this application, and data transmitted between a terminal 3 and a terminal 4 may also be considered as the sidelink data in this embodiment of this application.

In one case, the terminal may detect, monitor, or sense a resource, to select the resource from the first resource pool to transmit the sidelink data. In this case, the first resource pool is a resource pool dedicated to a mode 2 (mode 2) terminal. In another case, the terminal may detect, monitor, or sense a resource, to select the resource from the first resource pool to transmit the sidelink data, or may use, based on scheduling by a network device, a resource in the first resource pool to transmit the sidelink data. In this case, the first resource pool is a resource pool shared by a mode 1 (mode 1) terminal and the mode 2 (mode 2) terminal.

In Embodiment 1 and Embodiment 2 of this application, the mode 1 terminal is a terminal that uses a mode 1 to perform sidelink communication. The mode 1 is a communication mode in which communication is performed based on scheduling by the network device. The mode 2 terminal is a terminal that uses a mode 2 to perform sidelink communication. The mode 2 is generally a communication mode in which the terminal autonomously selects a resource for communication based on sensing, detecting, or monitoring a resource included in a resource pool, for example, a communication mode in which a resource is used according to a resource preemption method.

Step 201 is an optional step.

202: The terminal obtains a second resource pool, where the second resource pool is a supplementary resource pool used to transmit the sidelink data, that is, the second resource pool is a resource pool supplementary for the sidelink.

The second resource pool may be used to transmit the sidelink data based on a request of the terminal (for example, a first request in the following).

Optionally, the second resource pool can be used only based on the request, that is, can be used only based on the first request. The first request is sent under a specific condition.

A resource in the second resource pool may be dedicated to transmitting the sidelink data, that is, the resource in the second resource pool can be used to transmit only the sidelink data.

Alternatively, a resource in the second resource pool may be shared by the sidelink data and cellular link data. In this case, in one case, the second resource pool is used to transmit the sidelink data and the cellular link data. In this case, some resources in the second resource pool can transmit only the sidelink data, and the other resources can transmit only the cellular link data. In another case, the resource in the second resource pool is used to transmit the cellular link data, but can be used to transmit the sidelink data based on a request of the terminal. In other words, a same resource in the second resource pool may be separately used to transmit the sidelink data and the cellular link data at different moments.

Optionally, resources included in the first resource pool and the second resource pool are completely different.

When the network device allocates the resource in the second resource pool, the resource in the second resource pool may be allocated to transmit the cellular link data and further allocated to transmit the sidelink data. Therefore, to avoid affecting services such as a service with a relatively high QoS requirement and a URLLC service on a cellular link, when allocating the resource in the second resource pool to transmit the cellular link data, the network device may allocate the resource in the second resource pool to a semi-persistent scheduling (semi-persistent scheduling, SPS for short) service, a non-URLLC service, or a service with a relatively low QoS requirement.

The first resource pool may also be referred to as a main resource pool of the sidelink data or a resource set 1 (set1) of the sidelink data, and the second resource pool may also be referred to as a supplementary resource pool of the sidelink data or a resource set 2 (set2) of the sidelink data. The first resource pool, the second resource pool, or the first resource pool and the second resource pool may be preset, preconfigured, or predefined, may be obtained from operation administration and maintenance (Operation Administration and Maintenance, OAM for short), or may be configured by the network device for the terminal.

203: The terminal sends the first request to the network device, where the first request is used to request the resource in the second resource pool for the sidelink data. Correspondingly, the network device receives the first request from the terminal.

It should be noted that whether the terminal requests, from the network device, the resource in the first resource pool to transmit the sidelink data or the resource in the second resource pool to transmit the sidelink data depends on a requirement of the terminal. If the terminal requests, from the network device, the resource in the second resource pool to transmit the sidelink data, the terminal may perform step 203. If the terminal requests, from the network device, the resource in the first resource pool to transmit the sidelink data, the terminal may send, to the network device, a request used to request the resource in the first resource pool for the sidelink data.

V2X is a typical service between terminals. According to the method provided in this embodiment of this application, the terminal may obtain the first resource pool and the second resource pool, and the terminal may request, based on the requirement of the terminal, the resource in the first resource pool or the resource in the second resource pool to transmit the sidelink data. For example, when the resource in the first resource pool cannot meet a data transmission requirement of a large quantity of V2X services, the terminal may request the resource in the second resource pool to transmit the sidelink data. This ensures that the V2X services are normally performed.

Figure 3:
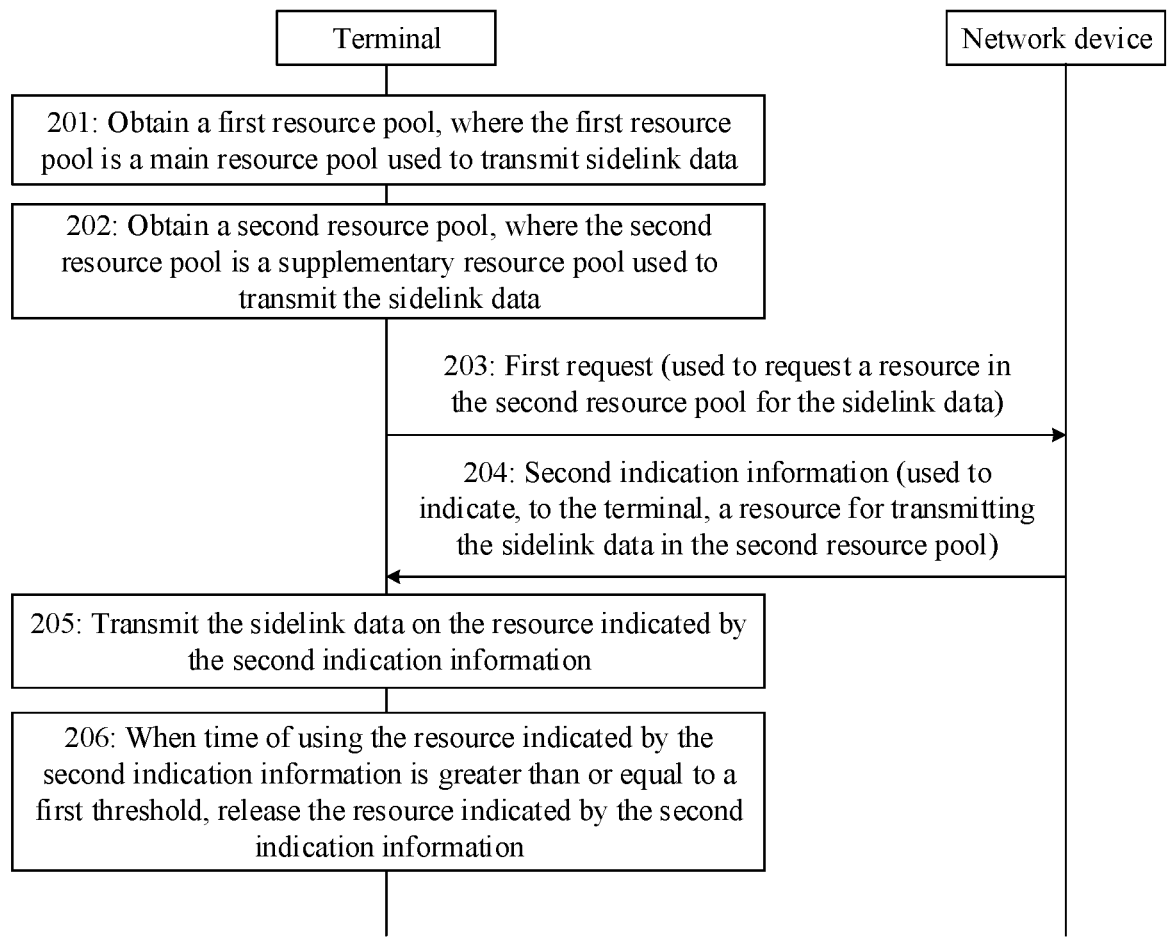

Refer to FIG. 3. Optionally, after step 203, the method further includes the following steps.

204: The network device sends second indication information to the terminal based on the first request, where the second indication information is used to indicate, to the terminal, a resource for transmitting the sidelink data, and the resource indicated by the second indication information belongs to the second resource pool.

During specific implementation of step 204, the network device may send the second indication information to the terminal by using a combination of at least one or more of higher layer signaling (for example, RRC signaling or media access control (media access control, MAC for short) control element (MAC control element, MAC CE for short)) signaling and physical layer signaling (for example, DCI).

For example, the network device may send the second indication information to the terminal by using physical layer signaling. The physical layer signaling may be DCI X, and the signaling includes an identifier of a resource pool. For example, the identifier of the resource pool is an index (index) of the resource pool.

For example, the network device may send the second indication information to the terminal by using higher layer signaling. For example, the network device configures a grant free resource (grant free resource) for the terminal in the second resource pool by using RRC signaling. The grant free resource does not need to be activated by dynamic signaling, and the terminal may directly use the resource to transmit the sidelink data.

For example, the network device may send the second indication information to the terminal by using higher layer signaling and physical layer signaling. For example, a grant free resource (grant free resource) is configured for the terminal in the second resource pool by using RRC signaling. Then, the network device may activate (or deactivate) the grant free resource by using DCI signaling, so that the terminal uses (or stops using) the resource in the second resource pool to transmit the sidelink data.

205: The terminal transmits the sidelink data on the resource indicated by the second indication information.

It should be noted that, during actual implementation, the first resource pool and the second resource pool may be configured for a plurality of terminals. Before step 205, the terminal may send indication information to a terminal receiving the sidelink data, where the indication information is used to indicate a resource for sending the sidelink data by the terminal, so that the terminal receiving the sidelink data determines a resource for receiving the sidelink data. For example, the indication information may be used for indication by using sidelink control information (sidelink control information, SCI for short) signaling. The resource for sending the sidelink data indicated by the SCI is the resource indicated by the second indication information.

The indication information may indicate a time domain resource (for example, a time domain resource indicated through a bitmap or in a direct indication manner), or may indicate a time domain resource (for example, a time domain resource indicated through a bitmap or in a direct indication manner) and a frequency domain resource (for example, a subchannel that is in a resource pool and that may be directly indicated).

When the first resource pool and the second resource pool are configured on the terminals, the SCI between the terminals may include an identifier of any resource pool in the first resource pool and the second resource pool. Therefore, the terminal receiving the sidelink data can determine a resource pool from which the resource for receiving the sidelink data comes. The identifier of the resource pool may be an index (index) of the resource pool. In this case, if the first resource pool overlaps the second resource pool in terms of time domain resources, a resource pool to which the used resource belongs may be learned by using an identifier of the resource pool.

Refer to FIG. 3. Optionally, after step 205, the method further includes the following steps.

206: When time of using, by the terminal, the resource indicated by the second indication information is greater than or equal to a first threshold, the terminal releases (or may be referred to as stops using) the resource indicated by the second indication information.

The first threshold may be preset, configured by the network device, determined by negotiation between the terminal and the network device, or determined by the terminal based on an actual application scenario. For example, the first threshold may be 10 milliseconds (ms), 100 ms, 5 minutes (min), 10 minutes, or the like.

During specific implementation of step 206, a timer (timer) may be defined for the terminal, and a timing value of the timer may be used to compare with the first threshold.

If the terminal that sends the sidelink data by using the resource indicated by the second indication information is referred to as a sending terminal, and the terminal that receives the sidelink data by using the resource indicated by the second indication information is referred to as a receiving terminal, when starting to use the resource indicated by the second indication information, the sending terminal may start the timer, and perform timing (that is, count a timing value of the timer). A moment at which the sending terminal starts to use the resource indicated by the second indication information may be a moment at which the sending terminal starts to send the SCI, a moment at which the sending terminal completes sending the SCI, or a moment at which the sending terminal sends data by using the resource indicated by the second indication information. Alternatively, when receiving the resource indicated by the second indication information, the sending terminal may start the timer and perform timing. A moment at which the sending terminal receives the resource indicated by the second indication information may be a moment at which the sending terminal starts to receive the second indication information, or a moment at which the sending terminal completes receiving the second indication information.

When time of using, by the sending terminal, the resource indicated by the second indication information, namely, the timing value of the timer, is greater than or equal to the first threshold, the sending terminal needs to stop using the resource indicated by the second indication information, that is, release the resource indicated by the second indication information, so that the resource is subsequently reallocated. This ensures that the network device flexibly schedules the resource in the second resource pool.

When starting to use the resource indicated by the second indication information, the receiving terminal may start the timer and perform timing. A moment at which the receiving terminal starts to use the resource indicated by the second indication information may be a moment at which the receiving terminal detects the SCI, or a moment at which the receiving terminal receives data by using the resource indicated by the second indication information.

When time of using, by the receiving terminal, the resource indicated by the second indication information, namely, a timing value of the timer, is greater than or equal to the first threshold, the receiving terminal needs to stop using the resource indicated by the second indication information, that is, release the resource indicated by the second indication information, so that the resource is subsequently reallocated. This ensures that the network device flexibly schedules the resource in the second resource pool.

After the resource in the second resource pool is released, when the terminal has sidelink data to be transmitted, the terminal may continue to request a resource in the first resource pool or the second resource pool from the network device, or the terminal may determine, in the first resource pool in an autonomous resource selection manner, a resource for transmitting the sidelink data. For example, the terminal uses the resource in the first resource pool based on automatic detection (detection) or automatic sensing (sensing) and based on a resource preemption method.

The first threshold may be known to both the terminal and the network device. The network device may estimate, based on the first threshold, a proportion of a resource that is in the second resource pool and that is allocated to transmit the sidelink data in the second resource pool. Alternatively, the network device may define a timer, and compare a timing value of the timer with the first threshold. The network device may estimate, based on the timer, a proportion of a resource that is in the second resource pool and that is allocated to transmit the sidelink data in the second resource pool.

When the network device indicates, to the terminal by using the second indication information, the resource that is in the second resource pool and that is used to transmit the sidelink data, the network device starts the timer, and performs timing. A moment at which the network device indicates, to the terminal by using the second indication information, the resource used to transmit the sidelink data in the second resource pool may be a moment at which the network device starts to send the second indication information, or a moment at which the network device completes sending the second indication information.

When the network device determines that the time of using, by the terminal, the resource indicated by the second indication information, that is, a timing value of the timer, is greater than or equal to the first threshold, the network device reclaims the resource indicated by the second indication information, so that the resource is subsequently reallocated. This ensures that the network device flexibly schedules the resource in the second resource pool.

Optionally, during specific implementation, step 203 is 203-*a*: The terminal sends the first request to the network device based on at least one of congestion information of the first resource pool, channel occupancy information of the first resource pool, a service type of the terminal, and a QoS level of the terminal.

The congestion information may include at least one of a busy rate (busy rate, BR for short), a congestion busy rate (congestion busy rate), and a congestion rate (congestion rate). The channel occupancy information includes at least one of a channel busy rate (channel busy rate), a channel occupancy rate (channel occupancy rate), and a channel rate (channel rate). The rate (rate) may also be referred to as a ratio (ratio).

The service type may be at least one of unicast (unicast), multicast (multicast) (which may also be referred to as multicast), and broadcast (broadcast). The QoS level may be a level of a QoS service determined based on a packet priority (ProSe Per-Packet Priority, PPPP for short) or a QoS index (5QoS index, 5QI for short) or based on any one or a combination of a latency, reliability, or the like. In this application, it is assumed that a QoS service with a higher level corresponds to a higher requirement. For example, when priorities are sorted in descending order of indexes, a requirement of a level-5 QoS service is higher than that of a level-3 QoS service; when priorities are sorted in ascending order of indexes, a requirement of a level-3 QoS service is higher than that of a level-5 QoS service. For another example, the QoS service determined based on any one or a combination of a latency, reliability, or the like includes a service having a low latency requirement, a service having a high reliability requirement, or a service that have a low latency requirement and a high reliability requirement and that correspond to a relatively high QoS level.

During specific implementation of step 203-*a*, the terminal may send the first request to the network device when one or more of the following conditions 1 to 4 are met.

Condition 1: The congestion information of the first resource pool is greater than or equal to a second threshold.

Condition 2: The channel occupancy information of the first resource pool is greater than or equal to a third threshold.

Condition 3: The QoS level of the terminal is greater than or equal to a fourth threshold.

Condition 4: The service type of the terminal is unicast or groupcast.

Any one of the second threshold, the third threshold, and the fourth threshold may be preset, or configured by the network device, or determined by negotiation between the terminal and the network device, or determined by the terminal based on an actual application scenario. For example, the second threshold may be 90%, the third threshold may be 80%, and the fourth threshold may be 3.

It should be noted that, in the condition 1, when the congestion information includes a plurality of pieces of information, each piece of information corresponds to one second threshold, and the condition 1 is met only when each piece of information is greater than or equal to a corresponding second threshold. Similarly, when the channel occupancy information includes a plurality of pieces of information, each piece of information corresponds to one third threshold, and the condition 2 is met only when each piece of information is greater than or equal to a corresponding third threshold.

The second threshold may also be referred to as a preset congestion threshold. The third threshold may also be referred to as a preset channel occupancy threshold. When the condition 1 or the condition 2 is met, it indicates that there are not many remaining resources in the first resource pool. In this case, the terminal may request, from the network device, a resource in the second resource pool to transmit the sidelink data, to ensure that a service is normally performed. The fourth threshold may also be referred to as a preset QoS threshold. When the condition 3 is met, it indicates that a current QoS service has a relatively high requirement, but the resource in the first resource pool is used by a plurality of terminals, and a remaining resource is limited. In this case, the terminal may request, from the network device, a resource in the second resource pool to transmit the sidelink data, to ensure that a service is normally performed. When the condition 4 is met, unicast or groupcast is a high-priority service type compared with broadcast, but the resource in the first resource pool is used by a plurality of terminals, and a remaining resource is limited. In this case, the terminal may request, from the network device, a resource in the second resource pool to transmit the sidelink data, to ensure that a service is normally performed.

Optionally, the first request may be any one of the following cases 1 to 3.

Case 1: The first request is an SR, and may be specifically an SR of a sidelink.

In the case 1, the first request is carried on a second-type SR resource, and the SR carried on the second-type SR resource is used to request the resource in the second resource pool for the sidelink data.

In the case 1, optionally, the method further includes: The terminal obtains an SR resource (namely, a resource used to send an SR), where the SR resource includes a first-type SR resource and the second-type SR resource, and an SR carried on the first-type SR resource is used to request the resource in the first resource pool for the sidelink data.

The first-type SR resource and the second-type SR resource may also be described as follows: The first-type SR resource is used to carry a first SR, the first SR is used to request the resource in the first resource pool for the sidelink data, the second-type SR resource is used to carry a second SR, and the second SR is used to request the resource in the second resource pool for the sidelink data.

In the case 1, the first-type SR resource, the second-type SR resource, or the first-type SR resource and the second-type SR resource may be preconfigured or may be configured by the network device for the terminal. In this case, the method further includes: The network device sends an SR resource configuration to the terminal, where the SR resource configuration is used to configure the SR resource. Correspondingly, the terminal receives the SR resource configuration from the network device. The SR resource configuration may also be referred to as SR resource configuration information.

In the case 1, the network device may determine, based on the SR resource for sending the SR, whether a resource requested by the terminal is the resource in the first resource pool or the resource in the second resource pool, and the terminal does not need to send additional signaling to notify the network device of the information. This can reduce signaling overheads. Specifically, if the network device receives the SR on the first-type SR resource, the network device determines that the resource requested by the terminal is the resource in the first resource pool; if the network device receives the SR on the second-type SR resource, the network device determines that the resource requested by the terminal is the resource in the second resource pool.

In the case 1, each of the first-type SR resource and the second-type SR resource may be a resource used to send an SR on the sidelink. In this case, the network device may further determine, based on the SR resource for sending the SR, whether the resource requested by the terminal is used to transmit the sidelink data or the cellular link data. Specifically, if the network device receives the SR on the first-type SR resource or the second-type SR resource, the network device determines that the resource requested by the terminal is used to transmit the sidelink data.

Case 2: The first request is a BSR, and may be specifically a BSR of a sidelink.

In the case 2, the BSR includes first indication information, and the first indication information is used to indicate that a resource requested by using the first request for the sidelink data is the resource in the second resource pool. Specifically, the first indication information may be added to a BSR MAC CE. The network device may determine, based on the first indication information, whether the resource requested by the terminal is the resource in the second resource pool, and the terminal does not need to send additional signaling to notify the network device of the information. This can avoid adding the additional signaling.

Case 3: The first request is a message used to report the congestion information or channel occupancy information of the first resource pool.

In the case 3, the first request includes the congestion information or channel occupancy information of the first resource pool, and the first request further includes first indication information.

In the case 2 and the case 3, the first indication information may be used for indication by using one or more bits (bit). For example, when one bit is used for indication, when a value of the bit is 1 (or 0), it indicates that the resource requested by the terminal is the resource in the second resource pool; otherwise, it indicates that the resource requested by the terminal is the resource in the first resource pool.

In the foregoing embodiment, if the first resource pool and the second resource pool are configured by the network device for the terminal, optionally, the method further includes the following steps.

(11) The network device determines a first configuration and a second configuration, where the first configuration is used to configure the first resource pool, and the second configuration is used to configure the second resource pool.

(12) The network device sends the first configuration and the second configuration to the terminal.

In this case, during specific implementation, step 201 may be 201-*a*: The terminal receives the first configuration from the network device. During specific implementation, step 202 may be 202-*a*: The terminal receives the second configuration from the network device.

The first configuration and the second configuration may be included in different messages, or may be included in a same message. This is not specifically limited in this embodiment of this application. The first configuration may also be referred to as first configuration information. The second configuration may also be referred to as second configuration information.

The network device may semi-statically configure one or more of the first resource pool and the second resource pool for one or more terminals. For example, the network device may configure the first resource pool and the second resource pool for the terminal by using one or more of higher layer signaling (for example, RRC signaling or MAC CE signaling) or physical layer signaling (for example, DCI). The signaling may include an index of the first resource pool and configuration information of the first resource pool, or an index of the second resource pool and configuration information of the second resource pool, or an index of the first resource pool, configuration information of the first resource pool, an index of the second resource pool, and configuration information of the second resource pool, or configuration information of the first resource pool and configuration information of the second resource pool. The network device may configure start positions of the configuration information of the first resource pool and the configuration information of the second resource pool, or preconfigure start positions of the configuration information of the first resource pool and the configuration information of the second resource pool. The terminal may obtain the configuration information of the first resource pool and the configuration information of the second resource pool based on the start positions of the configuration information of the first resource pool and the configuration information of the second resource pool.

The configuration information of the first resource pool, the configuration information of the second resource pool, or the configuration information of the first resource pool and the configuration information of the second resource pool may include the following several types of implementations:

The network device may indicate a time domain resource of at least one of the first resource pool and the second resource pool by using a slot format configuration of the sidelink. The slot format of the sidelink is configured by using semi-static signaling. For example, a slot format of one or more slots in a time period or a periodicity may be notified by using RRC signaling, or a slot format of one or more slots and one or more symbols in a time period or a periodicity may be notified. Specifically, the RRC signaling may be sidelink common time division multiplexing configuration signaling (SL common TDD configuration signaling) (for example, TDD-UL-DL-ConfigurationCommon, TDD-UL-DL-ConfigurationCommon-SL, SL-TDD-UL-DL-ConfigurationCommon, or TDD-UL-DL-SL-ConfigurationCommon) used for sidelink slot format configuration, or sidelink dedicated time division multiplexing configuration signaling (SL dedicated TDD configuration signaling) (for example, TDD-UL-DL-ConfigurationDedicated, TDD-UL-DL-ConfigurationDedicated-SL, SL-TDD-UL-DL- ConfigurationDedicated, or TDD-UL-DL-SL-ConfigurationDedicated) used for sidelink slot format configuration. The sidelink common time division multiplexing configuration signaling may be a SIB message.

Alternatively, the network device may indicate a time domain resource of at least one of the first resource pool and the second resource pool through a bitmap (bitmap). The bitmap may indicate one or more of slots or symbols. For example, it is assumed that the bitmap has 10 bits, and a value 1 of one of the bits indicates that a slot corresponding to the bit is used to transmit sidelink data. If the bitmap is 0000111100, it indicates that the network device configures the 5th slot to the 8th slot for the terminal to transmit the sidelink data. For another example, it is assumed that the bitmap has 14 bits, and a value 1 of one of the bits indicates that a symbol corresponding to the bit is used to transmit sidelink data. If the bitmap is 00001111000000, it indicates that the network device configures the 5th symbol to the 8th symbol in a slot for the terminal to transmit the sidelink data. Similarly, the network device may also configure a frequency domain resource and a space domain resource of the sidelink through a bitmap (bitmap). Principles are similar, and details are not described again.

The configuration information of the first resource pool may include a periodicity of the first resource pool, and the periodicity of the first resource pool is used to indicate a periodicity in which a resource in the first resource pool appears or is used. Resources in the first resource pool are sequentially repeated based on the periodicity of the first resource pool. The configuration information of the second resource pool may include a periodicity of the second resource pool, and the periodicity of the second resource pool is used to indicate a periodicity in which a resource in the second resource pool appears or is used. Resources in the second resource pool are sequentially repeated based on the periodicity of the second resource pool. The periodicity of the first resource pool and the periodicity of the second resource pool may be the same or different. This is not limited in this application.

During specific implementation of step (12), the first configuration and the second configuration may be implemented by using SL configuration signaling. The SL configuration signaling may be common time division duplex configuration signaling (common TDD configuration signaling), dedicated time division duplex configuration signaling (dedicated TDD configuration signaling), DCI5A, DCIX, SL-SCI, or the like.

Embodiment 2

Figure 4:
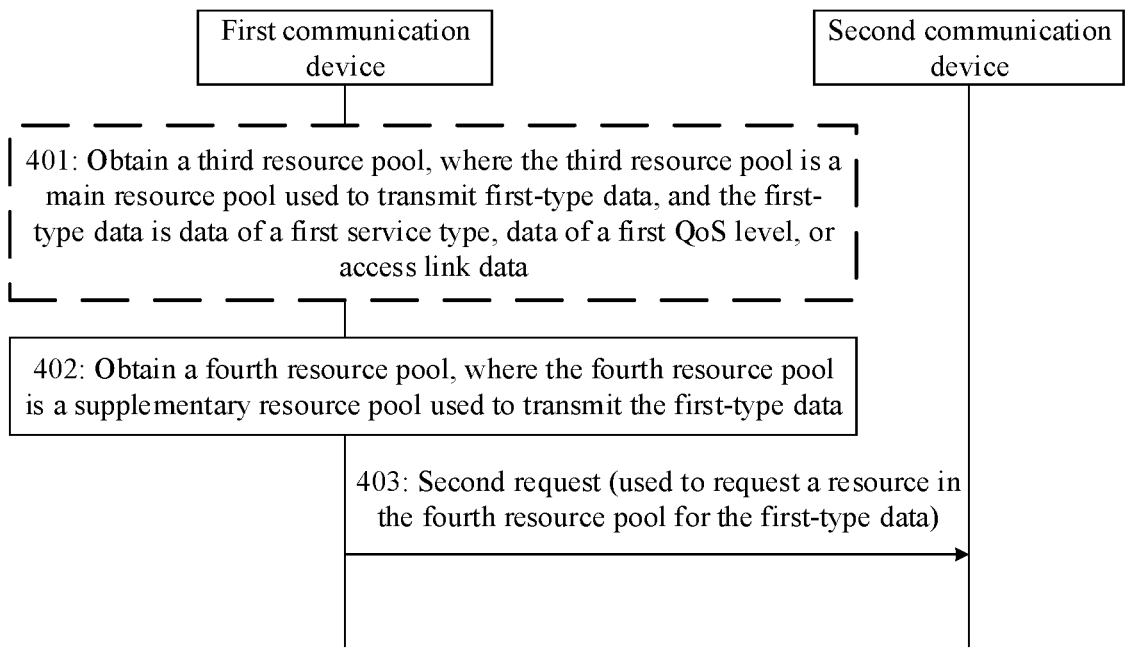

An embodiment of this application provides a communication method. As shown in FIG. 4, the method includes the following steps.

401: A first communication device obtains a third resource pool, where the third resource pool is a main resource pool used to transmit first-type data, and the first-type data is data of a first service type, data of a first QoS level, or access link data.

When the first-type data is the data of the first service type or the data of the first QoS level, the first service type data may be sidelink data.

The third resource pool is dedicated to the first-type data, and may be used to transmit only the first-type data.

In one case, the first communication device may detect, monitor, or sense a resource, to select the resource from the third resource pool to transmit the first-type data. In this case, the third resource pool is a resource pool dedicated to a mode 2 (mode 2) first communication device. In another case, the first communication device may detect, monitor, or sense a resource, to select the resource from the third resource pool to transmit the first-type data, or may use, based on scheduling by a second communication device, a resource in the third resource pool to transmit the first-type data. In this case, the third resource pool is a resource pool shared by a mode 1 (mode 1) first communication device and the mode 2 (mode 2) first communication device.

The first service type may be one or more of unicast, groupcast, and broadcast. The first QoS level may be one or more QoS levels. For related descriptions of the QoS level, refer to the foregoing descriptions. Details are not described herein again. When the first-type data is the data of the first service type or the data of the first QoS level, the first communication device is a terminal, and the second communication device is a network device.

The access link data refers to data transmitted between a terminal and an IAB node. When the first-type data is the access link data, the first communication device is an integrated access and backhaul (integrated access and backhaul, IAB for short) node (for example, a terminal), and the second communication device is a donor node (for example, a base station).

Step 401 is an optional step.

402: The first communication device obtains a fourth resource pool, where the fourth resource pool is a supplementary resource pool used to transmit the first-type data, that is, the fourth resource pool is a resource pool supplementary for the first-type data.

The fourth resource pool may be used to transmit the first-type data based on a request of the first communication device (for example, a second request in the following).

A resource in the fourth resource pool may be dedicated to transmitting the first-type data, that is, the resource in the fourth resource pool can transmit only the first-type data.

Alternatively, a resource in the fourth resource pool may be shared by the first-type data and second-type data. The first-type data and the second-type data are different types of data. In this case, in one case, the fourth resource pool is used to transmit the first-type data and the second-type data. In this case, some resources in the fourth resource pool can transmit only the first-type data, and the other resources can transmit only the second-type data. In another case, the resource in the fourth resource pool is used to transmit the second-type data, but can be used to transmit the first-type data based on a request of the first communication device. In other words, a same resource in the fourth resource pool may be separately used to transmit the first-type data and the second-type data at different moments.

When the first-type data is the data of the first service type, the second-type data is data of a second service type. There may be one or more first service types, and there may also be one or more second service types. For example, when the first service type is unicast, the second service type is groupcast, broadcast, or groupcast and broadcast. When the first service type is groupcast, the second service type is unicast, broadcast, or unicast and broadcast.

When the first-type data is the data of the first QoS level, the second-type data is data of a second QoS level. There may be one or more first QoS levels, and there may also be one or more second QoS levels. For example, when the first QoS level is 5QI 1, the second QoS level is 5QI 2, 5QI 3, or 5QI 2 and 5QI 3. When the first QoS level is PPPP 1, the second QoS level is PPPP 2, PPPP 3, or PPPP 2 and PPPP 3.

When the first-type data is access link data, the second-type data is backhaul link data. The backhaul link data refers to data that the IAB node sends back to the donor node.

The third resource pool may also be referred to as a main resource pool of the first-type data or a resource set 1 (set1) of the first-type data, and the fourth resource pool may also be referred to as a supplementary resource pool of the first-type data or a resource set 2 (set2) of the first-type data. The third resource pool, the fourth resource pool, or the third resource pool and the fourth resource pool may be preset, preconfigured, or predefined, may be obtained from OAM, or may be configured by the second communication device for the first communication device.

If the third resource pool and the fourth resource pool are configured by the second communication device for the first communication device, the method further includes the following steps.

(11) The second communication device sends a third configuration and a fourth configuration to the first communication device, where the third configuration is used to configure the third resource pool, and the fourth configuration is used to configure the fourth resource pool. Correspondingly, the first communication device receives the third configuration and the fourth configuration from the second communication device.

In this case, during specific implementation, step 401 may be 401-*a*: The first communication device receives the third configuration from the second communication device. During specific implementation, step 402 may be 402-*a*: The first communication device receives the fourth configuration from the second communication device.

The third configuration and the fourth configuration may be included in different messages, or may be included in a same message. This is not specifically limited in this embodiment of this application. The third configuration may also be referred to as third configuration information. The fourth configuration may also be referred to as fourth configuration information.

The second communication device may semi-statically configure one or more of the third resource pool and the fourth resource pool for the first communication device. For example, the second communication device may configure the third resource pool and the fourth resource pool for the first communication device by using one or more of higher layer signaling (for example, RRC signaling or MAC CE signaling) or physical layer signaling (for example, DCI). The signaling may include an index of the third resource pool and configuration information of the third resource pool, or an index of the fourth resource pool and configuration information of the fourth resource pool, or an index of the third resource pool, configuration information of the third resource pool, an index of the fourth resource pool, and configuration information of the fourth resource pool, or configuration information of the third resource pool and configuration information of the fourth resource pool. The second communication device may configure start positions of the configuration information of the third resource pool and the configuration information of the fourth resource pool, or preconfigure start positions of the configuration information of the third resource pool and the configuration information of the fourth resource pool. The first communication device may obtain the configuration information of the third resource pool and the configuration information of the fourth resource pool based on the start positions of the configuration information of the third resource pool and the configuration information of the fourth resource pool.

The configuration information of the third resource pool, the configuration information of the fourth resource pool, or the configuration information of the third resource pool and the configuration information of the fourth resource pool may include the following several types of implementations:

When the first-type data is data of the first service type or data of the first QoS level, the second communication device may configure a time domain resource of a sidelink by using the foregoing method. For example, the second communication device may indicate a time domain resource of at least one of the third resource pool and the fourth resource pool by using a slot format configuration of the sidelink. The slot format of the sidelink is configured by using semi-static signaling. For example, a slot format of one or more slots in a time period or a periodicity may be notified by using RRC signaling, or a slot format of one or more slots and one or more symbols in a time period or a periodicity may be notified. Specifically, the RRC signaling may be sidelink common time division multiplexing configuration signaling (SL common TDD configuration signaling) (for example, TDD-UL-DL-ConfigurationCommon, TDD-UL-DL-ConfigurationCommon-SL, SL-TDD-UL-DL-Configuration-Common, or TDD-UL-DL-SL-ConfigurationCommon) used for sidelink slot format configuration, or sidelink dedicated time division multiplexing configuration signaling (SL dedicated TDD configuration signaling) (for example, TDD-UL-DL-ConfigurationDedicated, TDD-UL-DL-ConfigurationDedicated-SL, SL-TDD-UL-DL-Configuration-Dedicated, or TDD-UL-DL-SL-ConfigurationDedicated) used for sidelink slot format configuration. The sidelink common time division multiplexing configuration signaling may be a SIB message.

The second communication device may configure a time domain resource in the third resource pool or the fourth resource pool through a bitmap (bitmap). The bitmap may indicate one or more of slots or symbols. For example, it is assumed that the bitmap has 10 bits, and a value 1 of one of the bits indicates that a slot corresponding to the bit is used to transmit the first-type data. If the bitmap is 0000111100, it indicates that the second communication device configures the 5th slot to the $8^{th}$ slot for the first communication device to transmit the first-type data. For another example, it is assumed that the bitmap has 14 bits, and a value 1 of one of the bits indicates that a symbol corresponding to the bit is used to transmit the first-type data. If the bitmap is 00001111000000, it indicates that the second communication device configures the 5th symbol to the $8^{th}$ symbol in the slot for the first communication device to transmit the first-type data. Similarly, the second communication device may also configure a frequency domain resource and a space domain resource in the third resource pool or the fourth resource pool through a bitmap (bitmap). Principles are similar, and details are not described again.

The configuration information of the third resource pool may include a periodicity of the third resource pool, and the periodicity of the third resource pool is used to indicate a periodicity in which a resource in the third resource pool appears or is used. Resources in the third resource pool are sequentially repeated based on the periodicity of the third resource pool. The configuration information of the fourth resource pool may include a periodicity of the fourth resource pool, and the periodicity of the fourth resource pool is used to indicate a periodicity in which a resource in the fourth resource pool appears or is used. Resources in the fourth resource pool are sequentially repeated based on the periodicity of the fourth resource pool. The periodicity of the third resource pool and the periodicity of the fourth resource pool may be the same or different. This is not limited in this application.

403: The first communication device sends a second request to the second communication device, where the second request is used to request the resource in the fourth resource pool for the first-type data. The second communication device receives the second request from the first communication device.

The second request may be any one of the following cases 1 to 3.

Case 1: The second request is an SR.

In the case 1, the second request is carried on a fourth-type SR resource, and the SR carried on the fourth-type SR resource is used to request the resource in the fourth resource pool for the first-type data.

In the case 1, optionally, the method further includes: The first communication device obtains an SR resource, where the SR resource includes a third-type SR resource and the fourth-type SR resource, and an SR carried on the third-type SR resource is used to request the resource in the third resource pool for the first-type data.

The third-type SR resource and the fourth-type SR resource may also be described as follows: The third-type SR resource is used to carry a third SR, the third SR is used to request the resource in the third resource pool for the first-type data, the fourth-type SR resource is used to carry a fourth SR, and the fourth SR is configured to request the resource in the fourth resource pool for the first-type data.

In the case 1, the third-type SR resource, the fourth-type SR resource, or the third-type SR resource and the fourth-type SR resource may be preconfigured or may be configured by the second communication device for the first communication device. In this case, the method further includes: The second communication device sends an SR resource configuration to the first communication device, where the SR resource configuration is used to configure the SR resource. Correspondingly, the first communication device receives the SR resource configuration from the second communication device. The SR resource configuration may also be referred to as SR resource configuration information.

In the case 1, the second communication device may determine, based on the SR resource for sending the SR, whether a resource requested by the first communication device is the resource in the third resource pool or the resource in the fourth resource pool, and the first communication device does not need to send additional signaling to notify the second communication device of the information. This can reduce signaling overheads. Specifically, if the second communication device receives an SR on the third-type SR resource, the second communication device determines that the resource requested by the first communication device for the first-type data is the resource in the third resource pool; if the second communication device receives an SR on the fourth-type SR resource, the second communication device determines that the resource requested by the first communication device for the first-type data is the resource in the fourth resource pool.

Case 2: The second request is a BSR.

The BSR includes third indication information, and the third indication information is used to indicate that a resource requested by using the second request for the first-type data is the resource in the fourth resource pool. Specifically, the third indication information may be added to a BSR MAC CE. The second communication device may determine, based on the third indication information, whether the resource requested by the first communication device is the resource in the fourth resource pool, and the first communication device does not need to send additional signaling to notify the second communication device of the information. This can avoid additional signaling.

Case 3: The second request is a message used to report congestion information or channel occupancy information of the third resource pool.

The second request includes the congestion information or channel occupancy information of the third resource pool, and the second request further includes third indication information.

In the case 2 and the case 3, the third indication information may be used for indication by using one or more bits (bit). For example, when one bit is used for indication, when a value of the bit is 1 (or 0), it indicates that the resource requested by the first communication device is the resource in the fourth resource pool; otherwise, it indicates that the resource requested by the first communication device is the resource in the third resource pool.

It should be noted that whether the first communication device requests, from the second communication device, the resource in the third resource pool to transmit the first-type data or requests the resource in the fourth resource pool to transmit the first-type data depends on a requirement of the first communication device. If the first communication device requests, from the second communication device, the resource in the fourth resource pool to transmit the first-type data, the first communication device may perform step 403. If the first communication device requests, from the second communication device, the resource in the third resource pool to transmit the first-type data, the first communication device may send, to the second communication device, a request used to request the resource in the third resource pool for the first-type data.

According to the method provided in Embodiment 2, the first communication device may obtain the third resource pool and the fourth resource pool, and the first communication device may request, based on a requirement of the first communication device, a resource in the third resource pool or a resource in the fourth resource pool to transmit the first-type data. For example, when the resource in the third resource pool cannot meet a transmission requirement of a large amount of first-type data, the first communication device may request the resource in the fourth resource pool to transmit the first-type data. When the resource in the fourth resource is requested, the first communication device may indicate, by using the foregoing case 1, case 2, or case 3, that the requested resource is the resource in the fourth resource pool, and the first communication device does not need to send additional signaling to notify the second communication device of the information. This can ensure that the first-type data is normally transmitted without adding the additional signaling.

Figure 5:
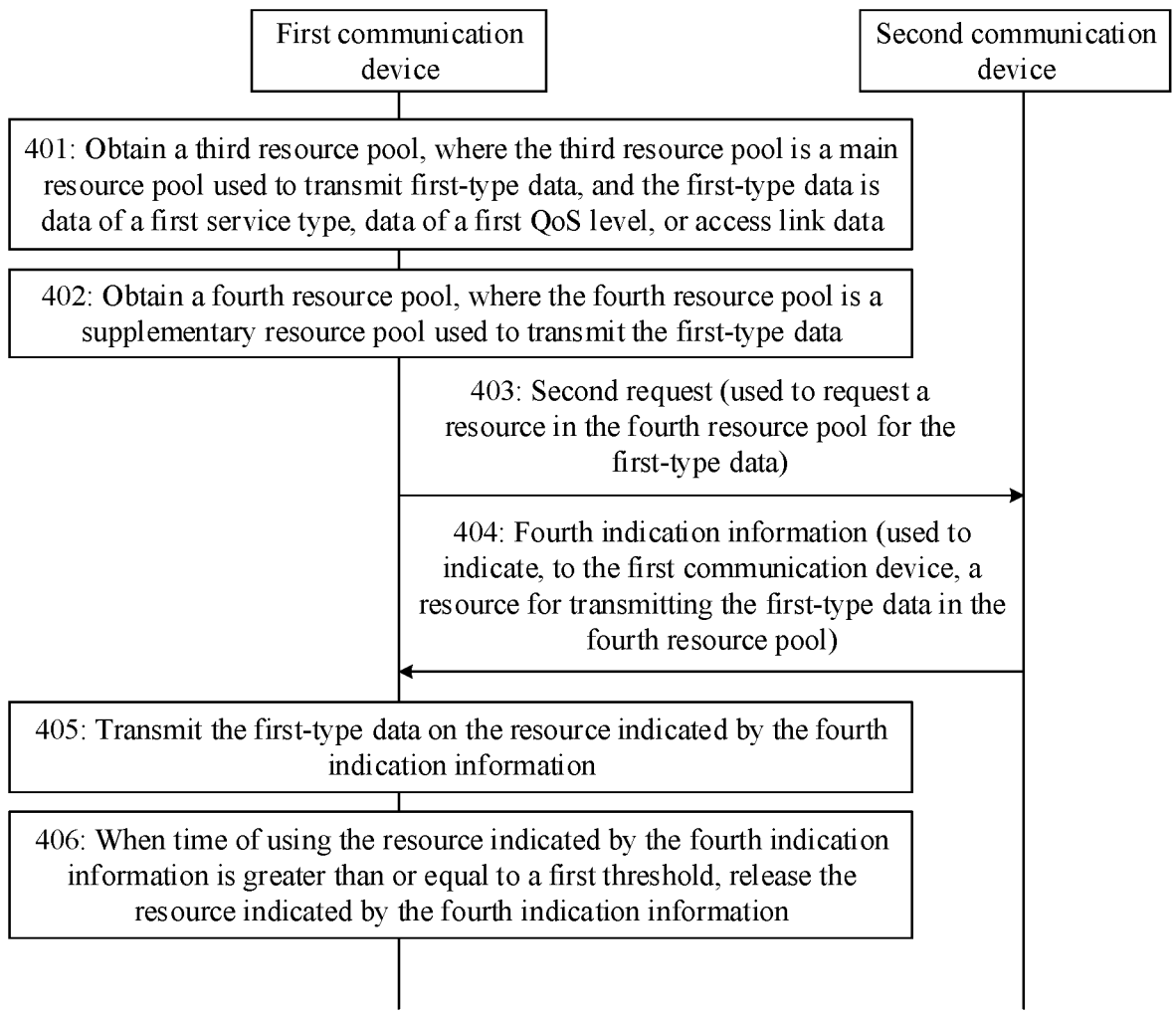

Refer to FIG. 5. Optionally, after step 403, the method further includes the following steps.

404: The second communication device sends fourth indication information to the first communication device based on the second request, where the fourth indication information is used to indicate, to the first communication device, a resource for transmitting the first-type data, and the resource indicated by the fourth indication information belongs to the fourth resource pool. Correspondingly, the first communication device receives the fourth indication information from the second communication device.

During specific implementation of step 404, the second communication device may send the fourth indication information to the first communication device by using at least one or a combination of higher layer signaling (for example, RRC signaling or MAC CE signaling) and physical layer signaling (for example, DCI).

For example, the second communication device may send the fourth indication information to the first communication device by using physical layer signaling. The physical layer signaling may be DCI X, and the signaling includes an identifier of a resource pool. For example, the identifier of the resource pool is an index (index) of the resource pool.

For example, the second communication device may send the fourth indication information to the first communication device by using higher layer signaling. For example, the second communication device configures a grant free resource (grant free resource) for the first communication device in the fourth resource pool by using RRC signaling. The grant free resource does not need to be activated by dynamic signaling, and the first communication device may directly use the resource to transmit the first-type data.

For example, the second communication device may send the fourth indication information to the first communication device by using higher layer signaling and physical layer signaling. For example, a grant free resource (grant free resource) is configured for the first communication device in the fourth resource pool by using RRC signaling. Then, the second communication device may activate (or deactivate) the grant free resource by using DCI signaling, so that the first communication device uses (or stops using) the resource in the fourth resource pool to transmit the first-type data.

405: The first communication device transmits the first-type data on the resource indicated by the fourth indication information.

It should be noted that, during actual implementation, the third resource pool and the fourth resource pool may be configured for a plurality of first communication devices.

When the first-type data is data of the first service type or data of the first QoS level, before step 405, the first communication device may send indication information to a first communication device receiving the sidelink data, where the indication information is used to indicate a resource used by the first communication device to send the sidelink data, so that the first communication device receiving the sidelink data determines a resource for receiving the sidelink data. For example, the indication information may be used for indication by using SCI signaling. The resource for sending the sidelink data indicated by the SCI is the resource indicated by the fourth indication information.

The indication information may indicate a time domain resource (for example, a time domain resource indicated through a bitmap or in a direct indication manner), or may indicate a time domain resource (for example, a time domain resource indicated through a bitmap or in a direct indication manner) and a frequency domain resource (for example, a subchannel that is in a resource pool and that may be directly indicated).

When the third resource pool and the fourth resource pool are configured on the first communication devices, SCI between the first communication devices may include an identifier of any resource pool in the third resource pool and the fourth resource pool. Therefore, the first communication device receiving the sidelink data can determine a resource pool from which the resource for receiving the sidelink data comes. The identifier of the resource pool may be an index (index) of the resource pool. In this case, if the third resource pool overlaps the fourth resource pool in terms of time domain resources, a resource in a resource pool in which the used resource is may be learned by using an identifier of the resource pool.

Refer to FIG. 5. Optionally, after step 405, the method further includes the following steps.

406: When time of using, by the first communication device, the resource indicated by the fourth indication information is greater than or equal to a first threshold, the first communication device releases (which may also be referred to as stops using) the resource indicated by the fourth indication information.

The first threshold may be preset, configured by the second communication device, determined by negotiation between the first communication device and the second communication device, or determined by the first communication device based on an actual application scenario. For example, the first threshold may be 10 ms, 100 ms, 5 minutes (min), 10 minutes, or the like.

During specific implementation of step 406, the first communication device may define a timer (timer), and a timing value of the timer is the first threshold. When the time of using, by the first communication device, the resource in the fourth resource pool is greater than or equal to the timing value of the timer, the first communication device needs to stop using the resource in the fourth resource pool, that is, release the resource in the fourth resource pool, so that the resource is subsequently reallocated. This ensures that the second communication device flexibly schedules the resource in the fourth resource pool.

After the resource in the fourth resource pool is released, when the first communication device has first-type data to be transmitted, the first communication device may continue to request, from the second communication device, the resource in the third resource pool or the fourth resource pool.

The first threshold may be known to both the first communication device and the second communication device. The second communication device may estimate, based on the first threshold, a proportion of a resource that is in the fourth resource pool and that is allocated to transmit the first-type data in the fourth resource pool. Alternatively, the second communication device may define a timer, and a timing value of the timer is the first threshold. The second communication device may estimate, based on the timer, a proportion of a resource that is in the fourth resource pool and that is allocated to transmit the first-type data in the fourth resource pool.

Optionally, during specific implementation, step 403 is 403-*a*: The first communication device sends the second request to the second communication device based on at least one of congestion information of the third resource pool, channel occupancy information of the third resource pool, a service type of the first communication device, and a QoS level of the first communication device.

For related descriptions of the congestion information, the channel occupancy information, the service type, and the QoS level, refer to Embodiment 1. Details are not described herein again.

During specific implementation of step 403-*a*, the first communication device may send the second request to the second communication device when one or more of the following conditions 1 to 4 are met.

Condition 1: The congestion information of the third resource pool is greater than or equal to a second threshold.

Condition 2: The channel occupancy information of the third resource pool is greater than or equal to a third threshold.

Condition 3: The QoS level of the first communication device is greater than or equal to a fourth threshold.

Condition 4: The service type of the first communication device is unicast or groupcast.

Any one of the second threshold, the third threshold, and the fourth threshold may be preset, configured by the second communication device, determined by negotiation between the first communication device and the second communication device, or determined by the first communication device based on an actual application scenario. For example, the second threshold may be 90%, the third threshold may be 80%, and the fourth threshold may be 3.

For other related descriptions of the condition 1 to the condition 4, refer to Embodiment 1. Details are not described herein again. It should be noted that there is no direct connection between the thresholds having a same name in Embodiment 2 and Embodiment 1 (for example, the first threshold in Embodiment 2 and the first threshold in Embodiment 1). Values of the two may be the same or may be different. This is not limited in this application.

Optionally, the first-type data is sidelink data, and a symbol used to transmit the sidelink data is configured by using semi-static signaling sent by the second communication device. That is, the second communication device configures, for the first communication device by using semi-static signaling, the symbol used to transmit the sidelink data.

Optionally, the third configuration is carried in semi-static signaling, and/or the fourth configuration is carried in semi-static signaling.

The semi-static signaling may be one or more of higher layer signaling (for example, RRC signaling or MAC CE signaling) or physical layer signaling (for example, DCI).

Optionally, the third configuration is used to configure the third resource pool through a bitmap, and/or the fourth configuration is used to configure the fourth resource pool through a bitmap.

Optionally, the first-type data is sidelink data, and bits in the bitmap are used to indicate that one or more of slots or symbols are used to transmit the sidelink data. For example, if the bitmap is 0001, when a value of one of the bits is 1, it indicates that when a corresponding slot or symbol is used to transmit the sidelink data, 0001 indicates that the last slot or symbol in four slots or symbols is used to transmit the sidelink data.

Optionally, the third configuration is used to configure one or more symbols of symbols in one or more slots as the third resource pool, and/or the fourth configuration is used to configure one or more symbols of symbols in one or more slots as the fourth resource pool.

Optionally, the first-type data is the sidelink data, and the symbols in the one or more slots are symbols used to transmit the sidelink data; and the symbols in the one or more slots are all symbols in at least one slot of the one or more slots, the symbols in the one or more slots are some symbols in at least one slot of the one or more slots, or the symbols in the one or more slots are all symbols in at least one slot of the one or more slots and some symbols in at least one slot of the one or more slots. For example, if the one or more slots are five slots, the symbols in the one or more slots may be all symbols in the $2^{nd}$ slot in the five slots, all symbols in the $2^{nd}$ slot and all symbols in the $3^{rd}$ slot, some symbols in the $4^{th}$ slot, some symbols in the $4^{th}$ slot and some symbols in the 5th slot, all symbols in the $1^{st}$ slot, some symbols in the $5^{th}$ slot, or the like.

It should be noted that any "threshold", "indication information", or "configuration" in this application may be notified by using signaling, or may be preset. Being notified by using signaling includes being notified by the network device by using at least one of RRC signaling, MAC signaling, and physical layer signaling.

In this application, any "obtained" may be "received from the network device", or may be "preconfigured". In this application, that A and B are obtained includes: any one of A and B is received from the network device and the other one is preconfigured, both A and B are received from the network device, or both A and B are preconfigured. Being preconfigured includes being configured by OAM, or being preset.

"Greater than or equal to" in this embodiment of this application may alternatively be replaced with "exceeding".

The foregoing mainly describes the solutions in the embodiments of this application from a perspective of interaction between the network elements. It may be understood that to implement the foregoing functions, the network elements, for example, the network device and the terminal, include at least one of corresponding hardware structures and software modules for implementing the functions. A person skilled in the art should be easily aware that, in combination with units and algorithm steps in the examples described in the embodiments disclosed in this specification, this application can be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In the embodiments of this application, the network device and the terminal may be divided into functional units based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, in the embodiments of this application, division into the units is an example, and is merely logical function division. During actual implementation, another division manner may be used.

Figure 6:
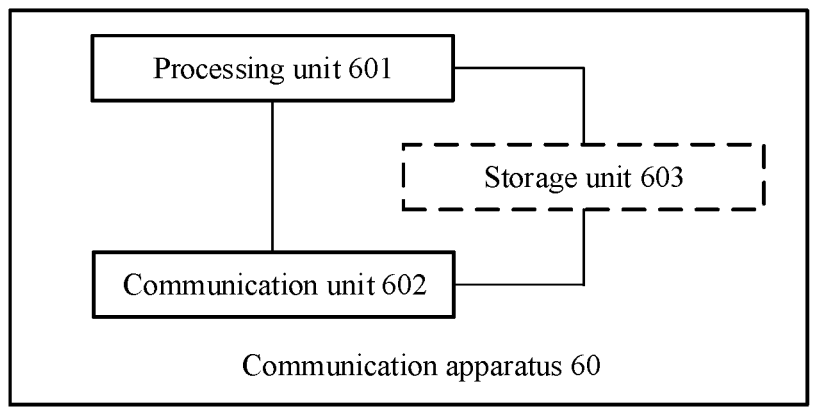
FIG. 6 is a schematic composition diagram of a communication apparatus according to an embodiment of this application.

When the integrated unit is used, FIG. 6 is a possible schematic structural diagram of a communication apparatus (denoted as a communication apparatus 60) in the foregoing embodiments. The communication apparatus 60 includes a processing unit 601 and a communication unit 602, and may further include a storage unit 603. The storage unit 603 is configured to store a computer program, to enable the processing unit 601 and the communication unit 602 to invoke the computer program to perform corresponding actions in the following. The schematic structural diagram shown in FIG. 6 may be used to show structures of the network device and the terminal in the foregoing embodiments.

When the schematic structural diagram shown in FIG. 6 is used to show the structure of the terminal in the foregoing embodiments, the communication apparatus 60 may be a terminal, or may be a chip in the terminal. In this case, actions performed by the processing unit 601 and the communication unit 602 are as follows:

The processing unit 601 is configured to obtain a first resource pool and a second resource pool, where the first resource pool is a main resource pool used to transmit sidelink data, and the second resource pool is a supplementary resource pool used to transmit the sidelink data.

The communication unit 602 is configured to send a first request to a network device, where the first request is used to request a resource in the second resource pool for the sidelink data.

Optionally, the processing unit 601 is specifically configured to receive a first configuration and a second configuration from the network device through the communication unit 602, where the first configuration is used to configure the first resource pool, and the second configuration is used to configure the second resource pool.

Optionally, the communication unit 602 is specifically configured to send the first request to the network device based on at least one of congestion information of the first resource pool, channel occupancy information of the first resource pool, a service type of the communication apparatus, and QoS of the communication apparatus.

Optionally, the first request is an SR, an SR resource includes a first-type SR resource and a second-type SR resource, and the first request is carried on the second-type SR resource. An SR carried on the first-type SR resource is used to request a resource in the first resource pool for the sidelink data, and the SR carried on the second-type SR resource is used to request the resource in the second resource pool for the sidelink data.

Optionally, the first request is a BSR, the BSR includes first indication information, and the first indication information is used to indicate that a resource requested by using the first request for the sidelink data is the resource in the second resource pool.

Optionally, the first request is a message used to report the congestion information or channel occupancy information of the first resource pool, the first request includes the congestion information or channel occupancy information of the first resource pool, the first request further includes first indication information, and the first indication information is used to indicate that a resource requested by using the first request for the sidelink data is the resource in the second resource pool.

Optionally, the communication unit 602 is further configured to receive second indication information from the network device, where the second indication information is used to indicate, for the communication apparatus, a resource for transmitting the sidelink data, and the resource indicated by the second indication information belongs to the second resource pool. The processing unit 601 is further configured to transmit the sidelink data on the resource indicated by the second indication information.

Optionally, the processing unit 601 is further configured to: when time of using the resource indicated by the second indication information is greater than or equal to a first threshold, release the resource indicated by the second indication information.

When the schematic structural diagram shown in FIG. 6 is used to show the structure of the network device in the foregoing embodiments, the communication apparatus 60 may be a network device, or may be a chip in the network device. In this case, actions performed by the processing unit 601 and the communication unit 602 are as follows:

The processing unit 601 is configured to determine a first configuration and a second configuration, where the first configuration is used to configure a first resource pool, the first resource pool is a main resource pool used to transmit sidelink data, the second configuration is used to configure a second resource pool, and the second resource pool is a supplementary resource pool used to transmit the sidelink data.

The communication unit 602 is configured to send the first configuration and the second configuration to a terminal.

Optionally, the communication unit 602 is further configured to receive a first request from the terminal, where the first request is used to request a resource in the second resource pool for the sidelink data.

Optionally, the first request is an SR, an SR resource includes a first-type SR resource and a second-type SR resource, and the first request is carried on the second-type SR resource. An SR carried on the first-type SR resource is used to request a resource in the first resource pool for the sidelink data, and the SR carried on the second-type SR resource is used to request the resource in the second resource pool for the sidelink data.

Optionally, the first request is a BSR, the BSR includes first indication information, and the first indication information is used to indicate that a resource requested by using the first request for the sidelink data is the resource in the second resource pool.

Optionally, the first request is a message used to report the congestion information or channel occupancy information of the first resource pool, the first request includes the congestion information or channel occupancy information of the first resource pool, the first request further includes first indication information, and the first indication information is used to indicate that a resource requested by using the first request for the sidelink data is the resource in the second resource pool.

Optionally, the processing unit 601 is further configured to send second indication information to the terminal based on the first request through the communication unit 602, where the second indication information is used to indicate, to the terminal, a resource for transmitting the sidelink data, and the resource indicated by the second indication information belongs to the second resource pool.

When the schematic structural diagram shown in FIG. 6 is used to show the structure of the terminal in the foregoing embodiments, the communication apparatus 60 may be a terminal, or may be a chip in the terminal. In this case, the processing unit 601 and the communication unit 602 may further perform the following actions:

The processing unit 601 is configured to obtain a third resource pool and a fourth resource pool, where the third resource pool is a main resource pool used to transmit first-type data or a resource pool used to transmit the first-type data, and the fourth resource pool is a supplementary resource pool used to transmit the first-type data or a resource pool used to transmit the first-type data based on a request; and the first-type data is data of a first service type, data of a first quality of service QoS level, or access link data.

The communication unit 602 is configured to send a second request to a second communication device, where the second request is used to request a resource in the fourth resource pool for the first-type data.

Optionally, the second request is an SR, the second request is carried on a fourth-type SR resource, and the SR carried on the fourth-type SR resource is used to request the resource in the fourth resource pool for the first-type data; the second request is a BSR, the BSR includes third indication information, and the third indication information is used to indicate that a resource requested by using the second request for the first-type data is the resource in the fourth resource pool; or the second request is a message used to report congestion information or channel occupancy information of the third resource pool, the second request includes the congestion information or channel occupancy information of the third resource pool, the second request further includes third indication information, and the third indication information is used to indicate that a resource requested by using the second request for the first-type data is the resource in the fourth resource pool.

Optionally, the first-type data is sidelink data, and a symbol used to transmit the sidelink data is configured by using semi-static signaling sent by the second communication device.

Optionally, the processing unit 601 is specifically configured to receive a third configuration and a fourth configuration from the second communication device through the communication unit 602, where the third configuration is used to configure the third resource pool, and the fourth configuration is used to configure the fourth resource pool.

Optionally, the third configuration is carried in semi-static signaling, and/or the fourth configuration is carried in semi-static signaling.

Optionally, the third configuration is used to configure the third resource pool through a bitmap, and/or the fourth configuration is used to configure the fourth resource pool through a bitmap.

Optionally, the first-type data is sidelink data, and bits in the bitmap are used to indicate that one or more of slots or symbols are used to transmit the sidelink data.

Optionally, the third configuration is used to configure one or more symbols of symbols in one or more slots as the third resource pool, and/or the fourth configuration is used to configure one or more symbols of symbols in one or more slots as the fourth resource pool.

Optionally, the first-type data is the sidelink data, and the symbols in the one or more slots are symbols used to transmit the sidelink data; and the symbols in the one or more slots are all symbols in at least one slot of the one or more slots, the symbols in the one or more slots are some symbols in at least one slot of the one or more slots, or the symbols in the one or more slots are all symbols in at least one slot of the one or more slots and some symbols in at least one slot of the one or more slots.

Optionally, the communication unit 602 is specifically configured to send the second request to the second communication device based on at least one of congestion information of the third resource pool, channel occupancy information of the third resource pool, a service type of the communication apparatus, and a QoS level of the communication apparatus.

Optionally, the communication unit 602 is further configured to receive fourth indication information from the second communication device, where the fourth indication information is used to indicate, for the communication apparatus, a resource for transmitting the first-type data, and the resource indicated by the fourth indication information belongs to the fourth resource pool; and transmit the first-type data on the resource indicated by the fourth indication information.

Optionally, the processing unit 601 is further configured to: when time of using, by the communication apparatus, the resource indicated by the fourth indication information is greater than or equal to a first threshold, release the resource indicated by the fourth indication information.

When the schematic structural diagram shown in FIG. 6 is used to show the structure of the network device in the foregoing embodiments, the communication apparatus 60 may be a network device, or may be a chip in the network device. In this case, the processing unit 601 and the communication unit 602 may further perform the following actions:

The processing unit 601 is configured to send a third configuration and a fourth configuration through the communication unit 602 to a first communication device, where the third configuration is used to configure a third resource pool, the third resource pool is a main resource pool used to transmit first-type data or a resource pool used to transmit the first-type data, the fourth configuration is used to configure a fourth resource pool, and the fourth resource pool is a supplementary resource pool used to transmit the first-type data or a resource pool used to transmit the first-type data based on a request; and the first-type data is data of a first service type, data of a first QoS level, or access link data.

The processing unit 601 is further configured to receive a second request through the communication unit 602 from the first communication device, where the second request is used to request a resource in the fourth resource pool for the first-type data.

Optionally, the first-type data is sidelink data, and the communication apparatus configures, for the first communication device by using semi-static signaling, a symbol used to transmit the sidelink data.

Optionally, the third configuration is carried in semi-static signaling, and/or the fourth configuration is carried in semi-static signaling.

Optionally, the third configuration is used to configure the third resource pool through a bitmap, and/or the fourth configuration is used to configure the fourth resource pool through a bitmap.

Optionally, the first-type data is sidelink data, and bits in the bitmap are used to indicate that one or more of slots or symbols are used to transmit the sidelink data.

Optionally, the third configuration is used to configure one or more symbols of symbols in one or more slots as the third resource pool, and/or the fourth configuration is used to configure one or more symbols of symbols in one or more slots as the fourth resource pool.

Optionally, the first-type data is the sidelink data, and the symbols in the one or more slots are symbols used to transmit the sidelink data; and the symbols in the one or more slots are all symbols in at least one slot of the one or more slots, the symbols in the one or more slots are some symbols in at least one slot of the one or more slots, or the symbols in the one or more slots are all symbols in at least one slot of the one or more slots and some symbols in at least one slot of the one or more slots.

Optionally, the second request is an SR, the second request is carried on a fourth-type SR resource, and the SR carried on the fourth-type SR resource is used to request the resource in the fourth resource pool for the first-type data; the second request is a BSR, the BSR includes third indication information, and the third indication information is used to indicate that a resource requested by using the second request for the first-type data is the resource in the fourth resource pool; or the second request is a message used to report congestion information or channel occupancy information of the third resource pool, the second request includes the congestion information or channel occupancy information of the third resource pool, the second request further includes third indication information, and the third indication information is used to indicate that a resource requested by using the second request for the first-type data is the resource in the fourth resource pool.

Optionally, the processing unit 601 is further configured to send fourth indication information to the first communication device based on the second request by using the communication unit 602, where the fourth indication information is used to indicate, to the first communication device, a resource for transmitting the first-type data, and the resource indicated by the fourth indication information belongs to the fourth resource pool.

When the communication apparatus 60 is the terminal or the network device, the processing unit 601 may be a processor or a controller, and the communication unit 602 may be a communication interface, a transceiver, a transceiver circuit, a transceiver apparatus, or the like. The communication interface is a generic term, and may include one or more interfaces. The storage unit 603 may be a memory. When the communication apparatus 60 is a chip in the terminal or the network device, the processing unit 601 may be a processor or a controller, and the communication unit 602 may be an input/output interface, a pin, a circuit, or the like. The storage unit 603 may be a storage unit (for example, a register or a cache) in the chip, or may be a storage unit (for example, a read-only memory or a random access memory) that is in the terminal or the network device and that is located outside the chip.

The communication unit may also be referred to as a transceiver unit. An antenna having receiving and sending functions and a control circuit that are in the communication apparatus 60 may be considered as the communication unit 602 in the communication apparatus 60, and a processor having a processing function may be considered as the processing unit 601 in the communication apparatus 60. Optionally, a component configured to implement a receiving function in the communication unit 602 may be considered as a receiving unit. The receiving unit is configured to perform the receiving step in the embodiments of this application. The receiving unit may be a receiver, a receiver circuit, or the like. A component configured to implement a sending function in the communication unit 602 may be considered as a sending unit. The sending unit is configured to perform the sending step in the embodiments of this application. The sending unit may be a transmitter, a sending circuit, or the like.

When an integrated unit in FIG. 6 is implemented in a form of a software functional module and sold or used as an independent product, the integrated unit may be stored in a computer-readable storage medium. Based on such an understanding, the technical solutions in the embodiments of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor (processor) to perform all or some of the steps of the methods described in the embodiments of this application. The storage medium that stores the computer software product includes any medium that can store program code, for example, a USB flash drive, a removable hard disk, a read-only memory (read-only memory, ROM for short), a random access memory (random access memory, RAM for short), a magnetic disk, or an optical disc.

The unit in FIG. 6 may alternatively be referred to as a module. For example, the processing unit may be referred to as a processing module.

Figure 7:
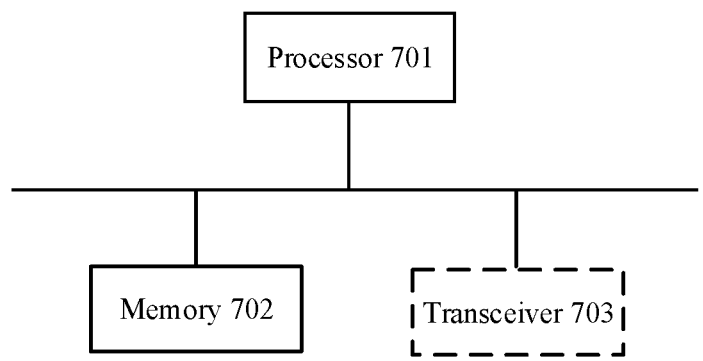
FIG. 7 and FIG. 8 each are a schematic diagram of a hardware structure of a communication apparatus according to an embodiment of this application.
Figure 8:
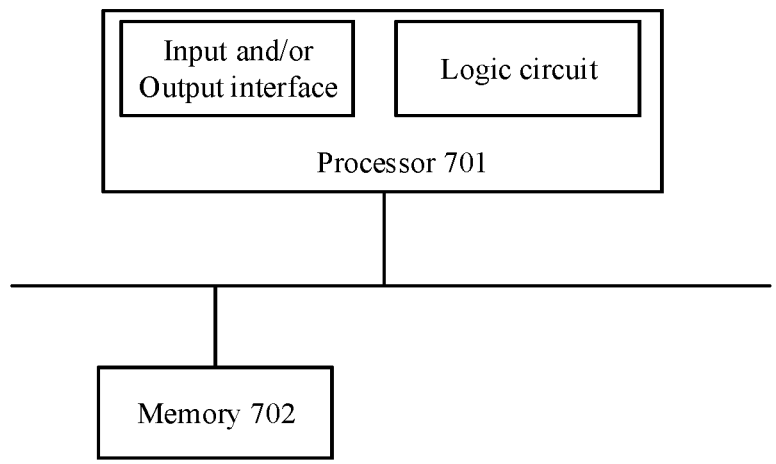

An embodiment of this application further provides a schematic structural diagram of hardware of a communication apparatus (denoted as a communication apparatus 70). Refer to FIG. 7 or FIG. 8. The communication apparatus 70 includes a processor 701, and optionally, further includes a memory 702 connected to the processor 701.

The processor 701 may be a general-purpose central processing unit (central processing unit, CPU for short), a microprocessor, an application-specific integrated circuit (application-specific integrated circuit, ASIC for short), or one or more integrated circuits configured to control program execution in the solutions in this application. The processor 701 may alternatively include a plurality of CPUs, and the processor 701 may be a single-core (single-CPU) processor or a multi-core (multi-CPU) processor. The processor herein may be one or more devices, circuits, or processing cores for processing data (for example, computer program instructions).

The memory 702 may be a ROM or another type of static storage device that can store static information and instructions, or a RAM or another type of dynamic storage device that can store information and instructions, or may be an electrically erasable programmable read-only memory (electrically erasable programmable read-only memory, EEPROM for short), a compact disc read-only memory (compact disc read-only memory, CD-ROM for short) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, this is not limited in this embodiment of this application. The memory 702 may exist independently, or may be integrated with the processor 701. The memory 702 may include computer program code. The processor 701 is configured to execute the computer program code stored in the memory 702, to implement the method provided in the embodiments of this application.

Refer to FIG. 7. In a first possible implementation, the communication apparatus 70 further includes a transceiver 703. The processor 701, the memory 702, and the transceiver 703 are connected by using a bus. The transceiver 703 is configured to communicate with another device or a communication network. Optionally, the transceiver 703 may include a transmitter and a receiver. A component configured to implement a receiving function in the transceiver 703 may be considered as a receiver. The receiver is configured to perform the receiving step in the embodiments of this application. A component configured to implement a sending function in the transceiver 703 may be considered as a transmitter. The transmitter is configured to perform the sending step in the embodiments of this application.

Based on the first possible implementation, the schematic structural diagram shown in FIG. 7 may be used to show a structure of the network device or the terminal in the foregoing embodiments.

When the schematic structural diagram shown in FIG. 7 is used to show a structure of the terminal in the foregoing embodiments, the processor 701 is configured to control and manage an action of the terminal. For example, the processor 701 is configured to support the terminal in performing 201 to 203 in FIGS. 2, 201 to 206 in FIGS. 3, 401 to 403 (in this case, the first communication device is a terminal) in FIGS. 4, 401 to 406 (in this case, the first communication device is a terminal) in FIG. 5, and/or an action performed by the terminal in another process described in the embodiments of this application. The processor 701 may communicate with another network entity through the transceiver 703, for example, communicate with the network device shown in FIG. 2. The memory 702 is configured to store program code and data of the terminal.

When the schematic structural diagram shown in FIG. 7 is used to show a structure of the network device in the foregoing embodiments, the processor 701 is configured to control and manage an action of the network device. For example, the processor 701 is configured to support the network device in performing 203 in FIGS. 2, 203 and 204 in FIG. 3, 403 in FIG. 4 (in this case, the second communication device is a network device, for example, a network device communicating with a terminal or a network device communicating with an IAB node (for example, a donor node)), 403 and 404 in FIG. 5 (in this case, the second communication device is a network device, for example, a network device communicating with a terminal or a network device communicating with an IAB node (for example, a donor node)), 401 to 403 in FIG. 4 (in this case, the first communication device is a network device (for example, an IAB node)), 401 to 406 in FIG. 5 (in this case, the first communication device is a network device (for example, an IAB node)), and/or an action performed by the network device in another process described in the embodiments of this application. The processor 701 may communicate with another network entity through the transceiver 703, for example, communicate with the terminal shown in FIG. 2. The memory 702 is configured to store program code and data of the network device.

In a second possible implementation, the processor 701 includes a logic circuit and at least one of an input interface and an output interface. The output interface is configured to perform a sending action in a corresponding method, and the input interface is configured to perform a receiving action in a corresponding method.

Based on the second possible implementation, the schematic structural diagram shown in FIG. 8 may be used to show a structure of the network device or the terminal in the foregoing embodiments.

When the schematic structural diagram shown in FIG. 8 is used to show a structure of the terminal in the foregoing embodiments, the processor 701 is configured to control and manage an action of the terminal. For example, the processor 701 is configured to support the terminal in performing 201 to 203 in FIGS. 2, 201 to 206 in FIGS. 3, 401 to 403 (in this case, the first communication device is a terminal) in FIGS. 4, 401 to 406 (in this case, the first communication device is a terminal) in FIG. 5, and/or an action performed by the terminal in another process described in the embodiments of this application. The processor 701 may communicate with another network entity through at least one of the input interface and the output interface, for example, communicate with the network device shown in FIG. 2. The memory 702 is configured to store program code and data of the terminal.

When the schematic structural diagram shown in FIG. 8 is used to show a structure of the network device in the foregoing embodiments, the processor 701 is configured to control and manage an action of the network device. For example, the processor 701 is configured to support the network device in performing 203 in FIGS. 2, 203 and 204 in FIG. 3, 403 in FIG. 4 (in this case, the second communication device is a network device, for example, a network device communicating with a terminal or a network device communicating with an IAB node (for example, a donor node)), 403 and 404 in FIG. 5 (in this case, the second communication device is a network device, for example, a network device communicating with a terminal or a network device communicating with an IAB node (for example, a donor node)), 401 to 403 in FIG. 4 (in this case, the first communication device is a network device (for example, an IAB node)), 401 to 406 in FIG. 5 (in this case, the first communication device is a network device (for example, an IAB node)), and/or an action performed by the network device in another process described in the embodiments of this application. The processor 701 may communicate with another network entity through at least one of the input interface and the output interface, for example, communicate with the terminal shown in FIG. 2. The memory 702 is configured to store program code and data of the network device.

In addition, an embodiment of this application further provides a schematic structural diagram of hardware of a terminal (denoted as a terminal 90) and a network device (denoted as a network device 100). For details, refer to FIG. 9 and FIG. 10.

Figure 9:
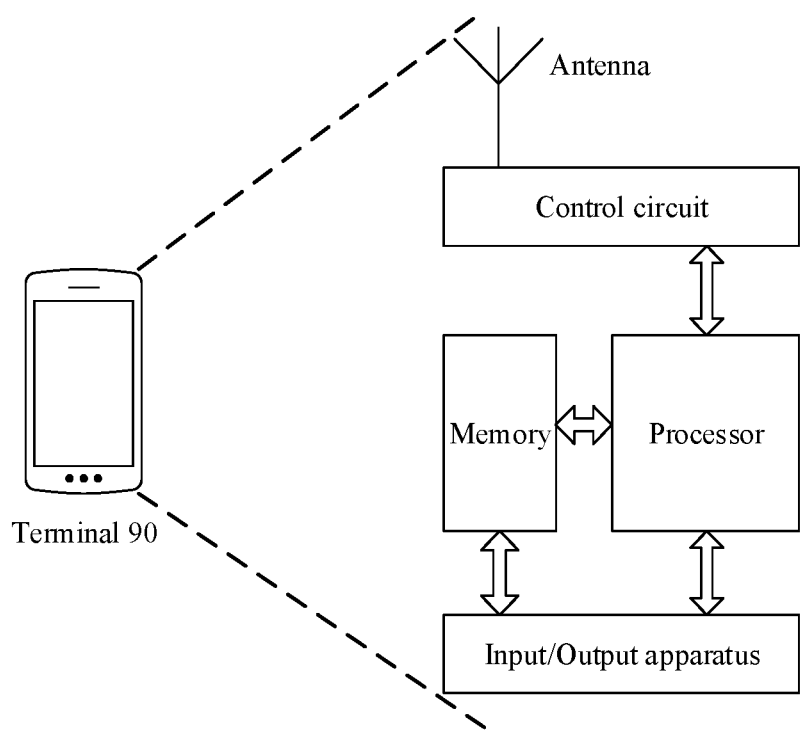
FIG. 9 is a schematic diagram of a hardware structure of a terminal according to an embodiment of is this application.

FIG. 9 is a schematic structural diagram of hardware of a terminal 90. For ease of description, FIG. 9 shows only main components of the terminal. As shown in FIG. 9, the terminal 90 includes a processor, a memory, a control circuit, an antenna, and an input/output apparatus.

The processor is mainly configured to process a communication protocol and communication data, control an entire terminal, execute a software program, and process data of the software program. For example, the processor is configured to control the terminal to perform 201 to 203 in FIGS. 2, 201 to 206 in FIGS. 3, 401 to 403 (in this case, the first communication device is a terminal) in FIGS. 4, 401 to 406 (in this case, the first communication device is a terminal) in FIG. 5, and/or an action performed by the terminal in another process described in the embodiments of this application. The memory is mainly configured to store the software program and the data. The control circuit (which may also be referred to as a radio frequency circuit) is mainly configured to: perform conversion between a baseband signal and a radio frequency signal, and process the radio frequency signal. A combination of the control circuit and an antenna may be referred to as a transceiver, mainly configured to send and receive a radio frequency signal in an electromagnetic wave form. The input/output apparatus, for example, a touchscreen, a display screen, or a keyboard, is mainly configured to receive data entered by a user and output data to the user.

After the terminal is powered on, the processor can read the software program in the memory, interpret and execute instructions of the software program, and process the data of the software program. When data needs to be sent by using the antenna, after performing baseband processing on the to-be-sent data, the processor outputs a baseband signal to a control circuit in a radio frequency circuit. After performing radio frequency processing on the baseband signal, the control circuit sends a radio frequency signal to the outside through the antenna in a form of an electromagnetic wave. When data is sent to the terminal, the control circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 9 shows only one memory and only one processor. An actual terminal may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communication protocol and the communication data. The central processing unit is mainly configured to control the entire terminal, execute the software program, and process the data of the software program. Functions of the baseband processor and the central processing unit are integrated into the processor in FIG. 9. A person skilled in the art may understand that the baseband processor and the central processing unit each may be an independent processor, and are interconnected by using a technology such as a bus. A person skilled in the art may understand that the terminal may include a plurality of baseband processors to adapt to different network standards, and the terminal may include a plurality of central processing units to enhance a processing capability of the terminal. The components in the terminal may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the memory in a form of a software program. The processor executes the software program to implement a baseband processing function.

Figure 10:
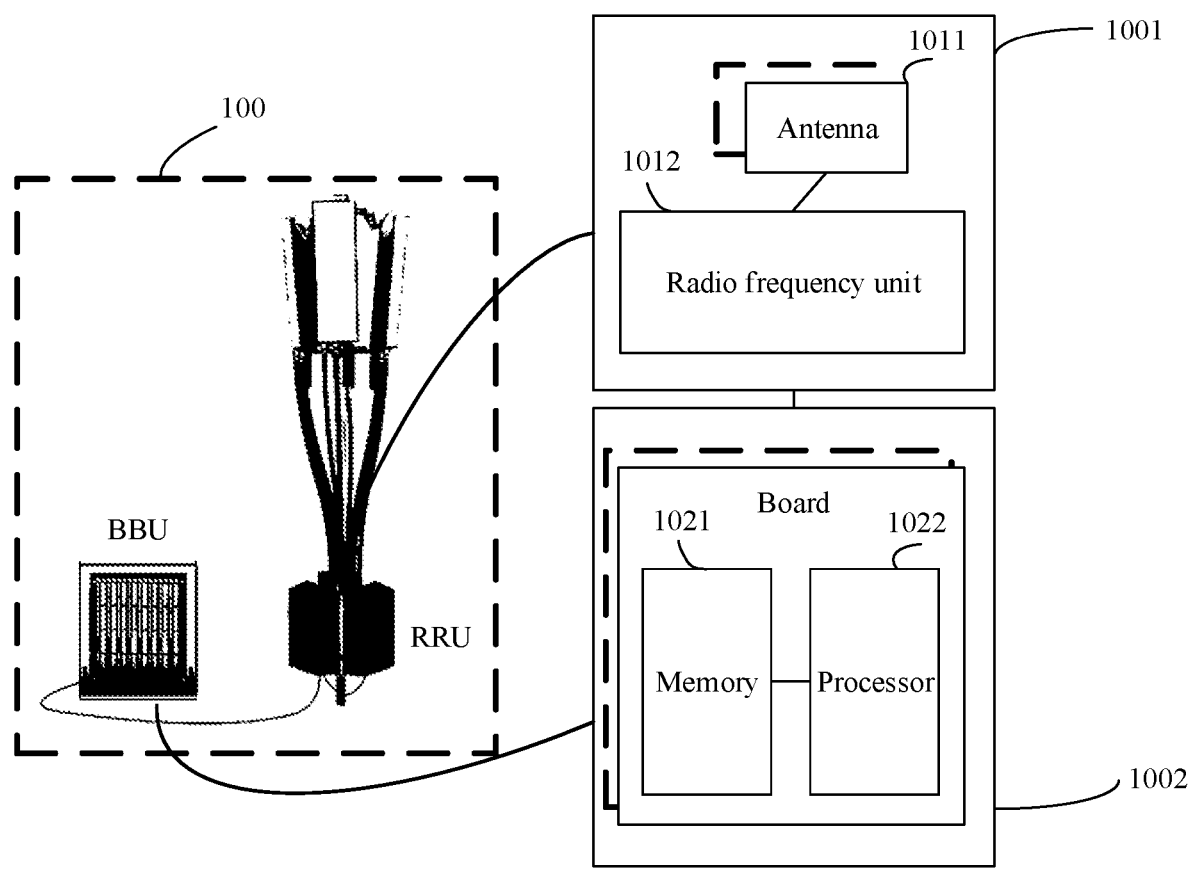
FIG. 10 is a schematic diagram of a hardware structure of a network device according to an embodiment of this application.

FIG. 10 is a schematic structural diagram of hardware of a network device 100 according to an embodiment of this application. The network device 100 may include one or more radio frequency units, such as a remote radio unit (remote radio unit, RRU for short) 1001 and one or more baseband units (baseband unit, BBU for short) (which may also be referred to as a digital unit (digital unit, DU for short)) 1002.

The RRU 1001 may be referred to as a transceiver unit, a transceiver circuit, a transceiver, or the like, and may include at least one antenna 1011 and a radio frequency unit 1012. The RRU 1001 is mainly configured to receive and send a radio frequency signal and perform conversion between a radio frequency signal and a baseband signal. The RRU 1001 and the BBU 1002 may be physically disposed together, or may be physically separately disposed, that is, a distributed base station.

The BBU 1002 is a control center of the network device, may be referred to as a processing unit, and is mainly configured to complete baseband processing functions such as channel coding, multiplexing, modulation, and spectrum spreading.

In an embodiment, the BBU 1002 may include one or more boards. A plurality of boards may jointly support a radio access network (such as an LTE network) of a single access standard, or may separately support radio access networks (such as an LTE network, a 5G network, or another network) of different access standards. The BBU 1002 further includes a memory 1021 and a processor 1022. The memory 1021 is configured to store necessary instructions and necessary data. The processor 1022 is configured to control the network device to perform a necessary action. The memory 1021 and the processor 1022 may serve one or more boards. In other words, a memory and a processor may be independently disposed on each board. Alternatively, a plurality of boards may share a same memory and a same processor. In addition, a necessary circuit may further be disposed on each board.

It should be understood that the network device 100 shown in FIG. 10 can perform 203 in FIGS. 2, 203 and 204 in FIG. 3, 403 in FIG. 4 (in this case, the second communication device is a network device, for example, a network device communicating with a terminal or a network device communicating with an IAB node (for example, a donor node)), 403 and 404 in FIG. 5 (in this case, the second communication device is a network device, for example, a network device communicating with a terminal or a network device communicating with an IAB node (for example, a donor node)), 401 to 403 in FIG. 4 (in this case, the first communication device is a network device (for example, an IAB node)), 401 to 406 in FIG. 5 (in this case, the first communication device is a network device (for example, an IAB node)), and/or an action performed by the network device in another process described in the embodiments of this application. Operations, functions, or operations and functions of modules in the network device 100 are respectively disposed to implement corresponding procedures performed in the method embodiments. For details, refer to the descriptions in the foregoing method embodiments. To avoid repetition, detailed descriptions are properly omitted herein.

In an implementation process, the steps of the methods provided in the embodiments may be performed by using a hardware integrated logic circuit in the processor or by using instructions in a form of software. The steps of the method disclosed with reference to the embodiments of this application may be directly performed by a hardware processor, or may be performed by using a combination of hardware and a software module that are in the processor. For other descriptions about the processors in FIG. 9 and FIG. 10, refer to the descriptions related to the processors in FIG. 7 and FIG. 8. Details are not described again.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a communication system, including the foregoing network device and the foregoing terminal.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedure or functions according to the embodiments of this application are generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, that can be integrated by using one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD for short)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, the term "comprising (comprising)" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and the accompanying drawings are merely examples for description of this application defined by the appended claims, and are considered as any or all of modifications, variations, combinations, or equivalents that cover the scope of this application. It is clear that a person skilled in the art can make various modifications and variations to this application without departing from the spirit and scope of this application. This application is intended to cover these modifications and variations of this application provided that they fall within the scope of the following claims and their equivalent technologies.

What is claimed is:

1. A communication method, comprising:
   obtaining, by a first communication device, a first resource pool and a second resource pool, wherein the first resource pool is a main resource pool for transmitting first-type data or a resource pool for transmitting the first-type data, and the second resource pool is a supplementary resource pool for transmitting the first-type data or a resource pool for transmitting the first-type data based on a request, and wherein the first-type data is data of a first service type, data of a first quality of service (QoS) level, or access link data that is data transmitted between a terminal and an integrated access and backhaul (IAB) node; and
   sending, by the first communication device, a second request to a second communication device, wherein the second request is used to request a resource in the second resource pool for the first-type data, and wherein at least one of the following is true:
   the second request is a scheduling request (SR), the second request is carried on a first-type SR resource, and the SR carried on the first-type SR resource is used to request the resource in the second resource pool for the first-type data;
   the second request is a buffer status report (BSR), the BSR comprises indication information, and the indication information indicates that a resource requested by using the second request for the first-type data is the resource in the second resource pool; or
   the second request is a message for reporting congestion information or channel occupancy information of the first resource pool, the second request comprises the congestion information or the channel occupancy information of the first resource pool, the second request further comprises indication information, and the indication information is used to indicate that a resource requested by using the second request for the first-type data is the resource in the second resource pool.

2. The method according to claim 1, wherein the first-type data is sidelink data, and a symbol used to transmit the sidelink data is configured by using semi-static signaling sent by the second communication device.

3. The method according to claim 1, wherein the obtaining, by a first communication device, a first resource pool and a second resource pool comprises:
   receiving, by the first communication device, a first configuration and a second configuration from the second communication device, wherein the first configuration is used to configure the first resource pool, and the second configuration is used to configure the second resource pool.

4. The method according to claim 3, wherein the first configuration is carried in semi-static signaling, and the second configuration is carried in semi-static signaling.

5. A communication method, comprising:
   sending, by a second communication device, a first configuration and a second configuration to a first communication device, wherein the first configuration configures a first resource pool, the first resource pool is a main resource pool used to transmit first-type data or a resource pool used to transmit the first-type data, the second configuration configures a second resource pool, and the second resource pool is a supplementary resource pool used to transmit the first-type data or a resource pool used to transmit the first-type data based on a request, and the first-type data is data of a first service type, data of a first quality of service (QOS) level, or access link data that is data transmitted between a terminal and an integrated access and backhaul (IAB) node, wherein the first-type data is sidelink data, and the second communication device configures, for the first communication device by using semi-static signaling, a symbol used to transmit the sidelink data; and
   receiving, by the second communication device, a second request from the first communication device, wherein the second request is used to request a resource in the second resource pool for the first-type data.

6. The method according to claim 5, wherein the first configuration is carried in semi-static signaling and the second configuration is carried in semi-static signaling.

7. The method according to claim 5, wherein the first configuration configures the first resource pool through a bitmap, and the second configuration configures the second resource pool through a bitmap.

8. The method according to claim 7, wherein the first-type data is sidelink data, and a bit in the bitmap indicates that one or more of slots or symbols are used to transmit the sidelink data.

9. A communication apparatus, comprising at least one processor, and one or more memories coupled to the at least one processor, wherein the one or more memories store programming instructions for execution by the at least one processor to cause the apparatus to:
   obtain a first resource pool and a second resource pool, wherein the first resource pool is a main resource pool for transmitting first-type data or a resource pool for transmitting the first-type data, and the second resource pool is a supplementary resource pool for transmitting the first-type data or a resource pool for transmitting the first-type data based on a request, and wherein the first-type data is data of a first service type, data of a first quality of service (QOS) level, or access link data that is data transmitted between a terminal and an integrated access and backhaul (IAB) node; and send a second request to a communication device, wherein the second request is used to request a resource in the second resource pool for the first-type data, and wherein at least one of the following is true:

the second request is a scheduling request (SR), the second request is carried on a first-type SR resource, and the SR carried on the first-type SR resource is used to request the resource in the second resource pool for the first-type data;

the second request is a buffer status report (BSR), the BSR comprises indication information, and the indication information indicates that a resource requested by using the second request for the first-type data is the resource in the second resource pool; or the second request is a message for reporting congestion information or channel occupancy information of the first resource pool, the second request comprises the congestion information or the channel occupancy information of the first resource pool, the second request further comprises indication information, and the indication information is used to indicate that a resource requested by using the second request for the first-type data is the resource in the second resource pool.

10. The apparatus according to claim 9, wherein the first-type data is sidelink data, and a symbol used to transmit the sidelink data is configured by using semi-static signaling sent by the communication device.

11. The apparatus according to claim 9, wherein the programming instructions, when executed by the at least one processor, cause the apparatus to:

receive a first configuration and a second configuration from the communication device, wherein the first configuration is used to configure the first resource pool, and the second configuration is used to configure the second resource pool.

12. The apparatus according to claim 11, wherein the first configuration is carried in semi-static signaling, and the second configuration is carried in semi-static signaling.

13. A communication apparatus, comprising at least one processor, and one or more memories coupled to the at least one processor, wherein the one or more memories store programming instructions for execution by the at least one processor to cause the apparatus to:

send a first configuration and a second configuration to a first communication device, wherein the first configuration configures a first resource pool, the first resource pool is a main resource pool used to transmit first-type data or a resource pool used to transmit the first-type data, the second configuration configures a second resource pool, and the second resource pool is a supplementary resource pool used to transmit the first-type data or a resource pool used to transmit the first-type data based on a request, and the first-type data is data of a first service type, data of a first quality of service (QOS) level, or access link data that is data transmitted between a terminal and an integrated access and backhaul (IAB) node, wherein the first configuration is carried in semi-static signaling and the second configuration is carried in semi-static signaling; and receive a second request from the first communication device, wherein the second request is used to request a resource in the second resource pool for the first-type data.

14. The apparatus according to claim 13, wherein the first-type data is sidelink data, and the programming instructions, when executed by the at least one processor, cause the apparatus to configure, for the first communication device by using semi-static signaling, a symbol used to transmit the sidelink data.

15. The apparatus according to claim 13, wherein the first configuration configures the first resource pool through a bitmap, and the second configuration configures the second resource pool through a bitmap.

16. The apparatus according to claim 15, wherein the first-type data is sidelink data, and a bit in the bitmap indicates that one or more of slots or symbols are used to transmit the sidelink data.

* * * * *

UNITED STATES PATENT AND TRADEMARK OFFICE
CERTIFICATE OF CORRECTION

PATENT NO. : 12,133,246 B2
APPLICATION NO. : 17/513446
DATED : October 29, 2024
INVENTOR(S) : Lili Zhang Page 1 of 1

It is certified that error appears in the above-identified patent and that said Letters Patent is hereby corrected as shown below:

On the Title Page

In Column 2 (item (56), Other Publications), In Line 2, Delete "Resrvation" and insert -- Reservation --.

In the Claims

In Column 46, In Line 37, In Claim 5, delete "(QOS)" and insert -- (QoS) --.

In Column 47, In Line 6, In Claim 9, delete "(QOS)" and insert -- (QoS) --.

In Column 48, In Line 21, In Claim 13, delete "(QOS)" and insert -- (QoS) --.

Signed and Sealed this
Fourth Day of February, 2025

Coke Morgan Stewart
*Acting Director of the United States Patent and Trademark Office*